US012784550B2

(12) United States Patent
Selvaraj et al.

(10) Patent No.: US 12,784,550 B2
(45) Date of Patent: Nov. 3, 2026

(54) SYSTEMS AND METHODS FOR CURRENCY AMOUNT DETERMINATION IN TOUCHLESS ATM SERVICES

(71) Applicant: FIDELITY INFORMATION SERVICES, LLC, Jacksonville, FL (US)

(72) Inventors: Pradeepraj Rangasamy Selvaraj, Bangalore (IN); Ashok Kumar Velladurai Pandian, Chennai (IN); Taruna Sahu, Bangalore (IN); Parul Bansal, Chandigarh (IN); Dushyantha Malthe Subbaiah, Bengaluru (IN)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 46 days.

(21) Appl. No.: 18/430,423

(22) Filed: Feb. 1, 2024

(65) Prior Publication Data

US 2025/0209893 A1 Jun. 26, 2025

(30) Foreign Application Priority Data

Dec. 20, 2023 (IN) ............................ 202311087188

(51) Int. Cl.

| | |
|---|---|
| ***G07F 19/00*** | (2006.01) |
| ***G06Q 20/02*** | (2012.01) |
| ***G06Q 20/10*** | (2012.01) |

(52) U.S. Cl.
CPC ......... *G07F 19/211* (2013.01); *G06Q 20/027* (2013.01); *G06Q 20/1085* (2013.01)

(58) Field of Classification Search
CPC . G07F 19/211; G06Q 20/027; G06Q 20/1085
See application file for complete search history.

(56) References Cited

U.S. PATENT DOCUMENTS 8,261,976 B1 * 9/2012 Block .................... G06Q 20/18 235/379
11,308,481 B1 * 4/2022 Thomas ........... G06Q 20/40155
(Continued)

FOREIGN PATENT DOCUMENTS

| | | | | |
|---|---|---|---|---|
| EP | 2355062 A * | 10/2011 | ............. | G07F 19/00 |
| WO | WO-2008065271 A2 * | 6/2008 | ............. | G06Q 20/32 |
| WO | WO-2016100965 A1 * | 6/2016 | ............. | G06Q 20/32 |

OTHER PUBLICATIONS

Chavan et al.: Automated Teller Machine Cash Demand Projection, 2021, ISSS, pp. 142-147 (Year: 2021).*
(Continued)

*Primary Examiner* — Bijendra K Shrestha
(74) *Attorney, Agent, or Firm* — Finnegan, Henderson, Farabow, Garrett & Dunner, LLP

(57) ABSTRACT

Systems and methods are provided for services utilizing transaction devices such as Automated Teller Machines. An example method comprises receiving a request comprising at least one constraint for a transaction and providing at least one ATM that satisfies at least one constraint of the request. A second method comprises analyzing, via a language model, the request, and based on the analysis, determining the at least one ATM that satisfies at least one constraint of the request. A third method comprises utilizing a QR code to perform a transaction at an ATM without receiving tactile input.

18 Claims, 10 Drawing Sheets

(56) References Cited

U.S. PATENT DOCUMENTS

| | | | | |
|---|---|---|---|---|
| 2010/0030687 | A1* | 2/2010 | Panthaki | G06Q 40/02 705/42 |
| 2011/0184865 | A1* | 7/2011 | Mon | G07F 19/20 235/379 |
| 2016/0180307 | A1* | 6/2016 | Laracey | G06Q 20/327 705/43 |
| 2017/0140353 | A1* | 5/2017 | Burdick | G07F 19/209 |
| 2018/0341934 | A1* | 11/2018 | Rodrigues | G07F 19/209 |
| 2021/0150497 | A1* | 5/2021 | Phillips | G06Q 20/3276 |

OTHER PUBLICATIONS

Waqas et al.: ATM Tracker: Tracking the Status of Automated Teller Machine for User's Easiness, 2019, Association for Computing Machinery, pp. 67-71 (Year: 2019).*

Baloch et al.: User-Centric Context-Aware Location-Based Service for ATM'sUsers, Sep. 20, 2023, Vawkum Transactions on Cmputer Sciences, vol. 111, No. 2, pp. 60-69 (Year: 2023).*

International Search Report and Written Opinion for counterpart PCT application No. PCT/2024/059284, mailed Jan. 15, 2025. (11 pages).

Baloch et al. "User-Centric Context-Aware Location-Based Service for ATM's Users", Vawkum Transactions on Computer Sciences 11(2):60, Jun. 12, 2023. (11 pages).

Das et al. "Location Based ATM Locator System Using OpenStreetMap", IEEE, 2014. (7 pages).

* cited by examiner

SYSTEMS AND METHODS FOR CURRENCY AMOUNT DETERMINATION IN TOUCHLESS ATM SERVICES

CROSS-REFERENCE TO RELATED APPLICATIONS

This application claims the benefit of foreign priority of Indian Patent Application No. 202311087188, filed Dec. 20, 2023, the entire contents of which are incorporated herein by reference. Embodiments of this disclosure relate to services utilizing transaction devices such as Automated Teller Machines.

FIELD

Embodiments of this disclosure relate to services utilizing transaction devices such as Automated Teller Machines.

BACKGROUND

Automated Teller Machines (ATMs) have been used for decades to enable round-the-clock access to financial institution accounts such as deposit accounts at banks. Using ATMs, account holders can withdraw funds, deposit funds, and access account information. Some ATMs also enable other transactions, such as bill pay, ticket purchases, and stamp purchases.

Many ATMs are associated with a particular financial institution. This limits ATMs from performing certain transactions. For example, if an account holder has an account with Bank A, he may be unable to use an ATM operated by or on behalf of Bank B to withdraw money from his Bank A account. And even if that account holder can withdraw money from the Bank B ATM, he may be charged a high fee (by Bank B or Bank A), unable to deposit funds into his account at Bank A, or unable to access other account functions such as requesting a balance inquiry.

Furthermore, ATMs generally require that an account holder present a card with a magnetic stripe to withdraw funds from an ATM. Thieves know this, and have created devices to steal the data stored on that magnetic stripe. Thus, new systems have been developed that enable account holders to utilize smartphones to access their accounts. However, the solutions that exist for enabling smartphone access to accounts do not allow account holders to access accounts using smartphones at an ATM other than one owned by the bank holding the account, even if the bank owning the ATM has a relationship with the bank holding the account.

Furthermore, many ATMs only offer currency in certain denominations. This limits an account holder's ability to withdraw funds from their account in specific denominations. For example, if an account holder wishes to withdraw a total sum of one hundred dollars broken down into three 20-dollar bills, two 10-dollar bills, and four 5-dollar bills, many ATMs would not be able to satisfy this request. This problem is further compounded by the information regarding what denominations any given ATM is configured to dispense is not readily available or accessible by an account holder. Thus, if an account holder requires specific denominations, they often must travel to multiple ATMs until they find one that satisfies their request.

Furthermore, ATMs generally require physical interaction (e.g., pressing input keys, touchscreen) to operate. For example, an account holder inputs their pin by pressing on a physical or digital keypad. This creates an environment with the potential to transmit germs, bacteria, viruses, allergens, and other like microorganisms and pathogens.

Furthermore, ATMs that require physical interaction have a shorter functional service lifespan or require more frequent repairs because of the wear caused by use. For example, an account holder pressing on a physical or digital keypad causes an amount of wear, which when compounded by the number of account holders and time, cause damage requiring repair.

Furthermore, ATMs that require physical interaction take time to perform transactions. An account holder must be physically present in front of an ATM throughout the entire transaction process. This is timely to the account holder and inefficient for the ATM to idle until the account holder physically initiates the transaction. Remotely initiating a transaction with an ATM enables the ATM to process more transactions and amortize the time needed to process transactions by predetermining what bills need to be set aside.

It is accordingly a primary object of the disclosed embodiments to solve these problems as well as many others (e.g., similar problems associated with transaction devices).

SUMMARY

Embodiments of the present disclosure are directed to methods, systems, and computer-readable media for enabling financial transactions at transaction devices such as ATMs. An example method comprises receiving, from a user device, a request comprising at least one constraint for a desired transaction. The method further comprises communicating the request to at least one interbank network. The method further comprises determining at least one ATM that satisfies the at least one constraint of the request. The method further comprises providing, to the user device, the at least one ATM that satisfies the at least one constraint of the request. The method further comprises receiving, from the user device, a selection from a list of the at least one ATM that satisfies the at least one constraint of the request. The method further comprises communicating, with the at least one interbank network, the selection from the list of at least one result to initialize the transaction.

Systems and computer-readable media (such as non-transitory computer-readable media) that implement the above method are also provided.

A second method comprises receiving, from at least one user device, a request comprising at least one constraint for a desired transaction. The second method further comprises analyzing, via a language model, the language in the at least one constraint of the request. The second method further comprises based on the analysis, determining at least one ATM that satisfies the at least one constraint of the request. The second method further comprises providing, to the user device, the at least one ATM that satisfies the at least one constraint of the request a list of at least one result. The second method further comprises receiving, from the user device, a selection from a list of the at least one ATM that satisfies the at least one constraint of the request. The second method further comprises communicating, with at least one interbank network, the selection from the list.

Systems and computer-readable media (such as non-transitory computer-readable media) that implement the above method are also provided.

A third method comprises detecting, using the camera module, a Quick Response (QR) code. The third method further comprises based on detecting the QR code, initiating a data transfer module operatively connected to the image processing unit, the data transfer module configured to transfer and erase information associated with the QR code. The third method further comprises sending the information to an interbank network. The third method further comprises receiving a command from the interbank network to authorize a transaction. The third method further comprises activating the currency dispensing mechanism without direct user input.

Systems and computer-readable media (such as non-transitory computer-readable media) that implement the above method are also provided.

Additional objects and advantages of the embodiments will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and together with the description, serve to explain some principles.

BRIEF OVERVIEW

Example embodiments of this disclosure are related to enhancing account holders' ability to effect financial transactions at transaction devices such as ATMs. The ATMs can receive transaction requests which include transaction parameters. The transaction parameters can indicate a desire by an account holder to perform particular transactions, including withdrawals, deposits, balance inquires, ticket purchases, stamp purchases, balance transfers, or other transactions.

More specifically, some embodiments enable account holders to perform these types of transactions at an ATM that can satisfy their transaction, without having to travel to multiple ATMs to find such a one. Some embodiments also include utilizing machine learning to extract and provide to an account holder information about the services of specific ATMs. Some embodiments also include a completely or partially touchless ATM experience for an account holder.

DETAILED DESCRIPTION

Reference will now be made in detail to various embodiments, examples of which are illustrated in the accompanying drawings. Wherever possible, the same reference numbers will be used throughout the drawings to refer to the same or like parts.

Figure 1:
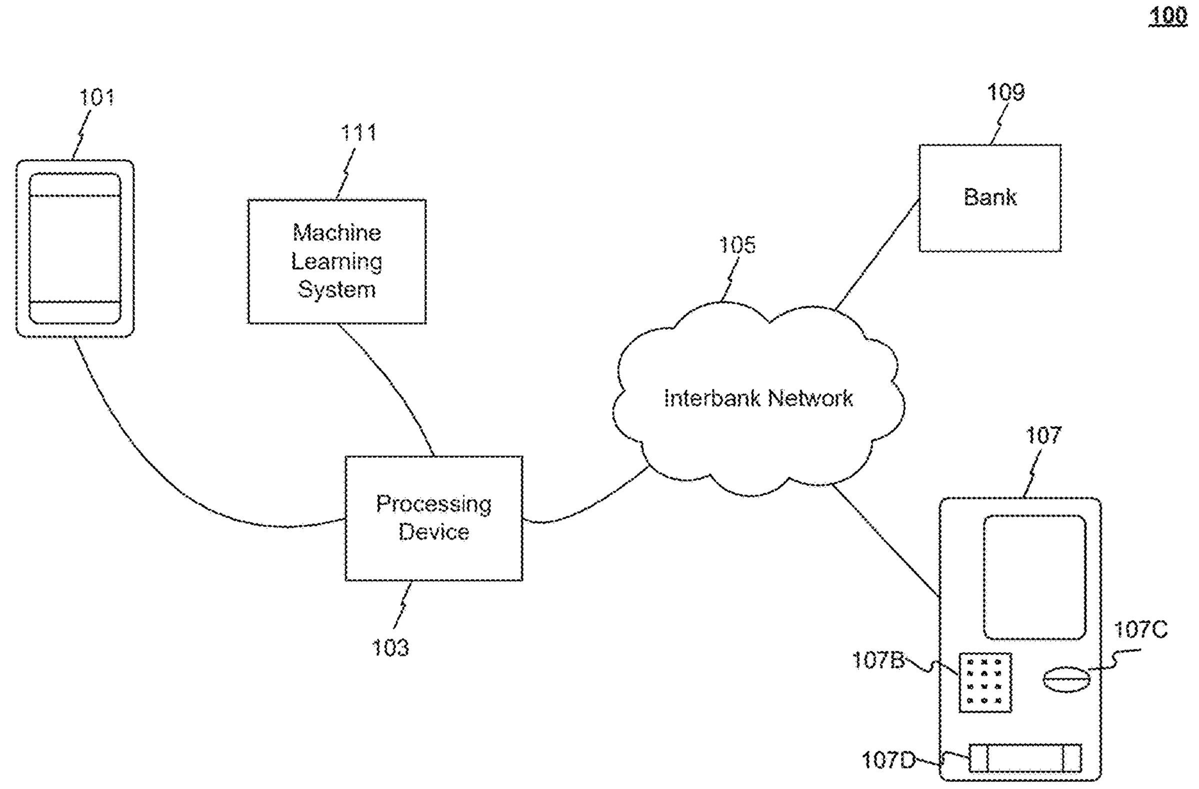
FIG. 1 is an exemplary system for use in implementing the disclosed embodiments.

FIG. 1 is a system 100 for use in implementing the disclosed embodiments. System 100 comprises mobile device 101, processing device 103, interbank network 105, transaction device 107, bank 109, and machine learning system 111. One of ordinary skill will understand that particular devices in system 100 can be duplicated, omitted, or modified, as appropriate. For example, transaction device 107 may communicate directly with processing device 103 and bank 109 without interbank network 105. Further, a plurality of transaction devices 107 may be connected to one of a plurality of interbank networks 105. In some embodiments, processing device 103 may be a separate device from interbank network 105. In other embodiments, processing device 103 may be incorporated as part of interbank network 105.

In some embodiments, each device illustrated in FIG. 1 may be operated by separate parties. However, in other embodiments, one party may operate or administer more than one of the devices illustrated in FIG. 1. For example, a single entity may operate any or all of processing device 103, interbank network 105, and transaction device 107. Additionally, in some embodiments, one of the illustrated devices in FIG. 1 may be combined with another illustrated device. For example, processing device 103 and machine learning system 111 may be combined into a single system.

Mobile device 101 represents a portable device usable by a user for communication purposes. Mobile device 101 may be implemented as a cellular phone, smartphone, wearable computer, personal digital assistant (PDA), personal media player (PMP), or the like. Mobile device 101 may comprise, for example, a touchscreen display, a non-touchscreen display, a keyboard, a pointing device, or other input device. Mobile device 101 may communicate with processing device 103 using a wireless network, a mobile network, a satellite network, or the like. Generally, it may be understood that any of the devices illustrated in FIG. 1 may communicate with any other device illustrated in FIG. 1 using a wireless network, mobile network, a satellite network, a physical data line, or the like.

Mobile device 101 may comprise storage for software that, when executed, causes mobile device 101 to send and/or receive information from devices such as transaction device 107. The software may be implemented in a variety of ways. In one example embodiment, the software may be operable to send and/or receive information from other devices using wireless protocols. For example, the software can be configured to enable mobile device 101 to send and/or receive information over a Bluetooth connection, over a wireless network connection (e.g., 802.11a/b/g/n), using Near-Field Communication (NFC), or other standard or proprietary communication protocol.

The software may also be configured to enable the transmission of information visually. For example, mobile device 101 may have a screen or display functionality, and may display information encoded in an image or visual image (such as a QR code) in such a way that transaction device 107 may capture the image or visual image.

Processing device 103 represents one or more electronic devices configured to perform a task. Processing device 103 may include or one or more known processing devices, such as, for example, a microprocessor. In some embodiments, processing device 103 may include any type of single or multi-core processor, mobile device microcontroller, central processing unit, or any circuitry that performs logic operations. In operation, processing device 103 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in processing device 103, or elsewhere.

In some embodiments, processing device 103 may be configured to facilitate communication between devices in system 100. Processing device 103 may be configured to receive data from a device. For example, processing device 103 may receive a request from mobile device 101 to initiate a transaction such as a cash withdrawal. In some embodiments, the request comprises at least one constraint. In some embodiments, the at least one constraint may include at least one of: a bank associated with the user, a location, a total amount of currency, or a breakdown of the total amount of currency by denomination.

Further, processing device 103 may be configured to send data to a device. For example, processing device 103 may send the request from mobile device 101 to interbank network 105 or machine learning system 111. Further, processing device 103 may be configured to generate values based on received data. For example, processing device 103 may generate a score associated with received data from interbank network 105.

Transaction device 107 represents a device configured to perform one or more financial transactions. Transaction device 107 may be implemented as, for example, an Automated Teller Machine (ATM). Transaction device 107 may comprise a keypad 107B (also known as a "10-key"). Keypad 107B may comprise 10 or more keys enabling input of letters, numbers, symbols, or other characters. Keypad 107B may be implemented as a physical keypad or as a virtual keypad (e.g., presented on a touchscreen of transaction device 107).

Transaction device 107 may also comprise a touchscreen display or a non-touchscreen display. Transaction device 107 may also comprise a card slot 107C enabling, for example, insertion of magnetic-stripe cards. Transaction device 107 may be connected to interbank network 105 via a wireless network, a wired network, a cellular network, a satellite network, or the like, and may communicate with other devices, such as mobile device 101, processing device 103, or bank 109, through interbank network 105. Transaction device 107 may also comprise a cash drawer 107D. Cash drawer 107D is configured to permit users can retrieve funds withdrawn from a user account.

In some embodiments, transaction device 107 may perform operations for initiating transactions. For example, transaction device 107 may communicate directly with one or more of interbank network 105, processing device 103, or bank 109. In some embodiments, transaction device 107 may involve drivers or switches (not pictured) which perform communications. Such drivers and/or switches reformat the communication into instructions that comply with a protocol associated with interbank network 105, and forward the reformatted communication to bank 109, as appropriate. Drivers may also receive and provide instructions to transaction device 107, images or other information for display on transaction device 107, communications received from other systems (such as bank 109) to transaction device 107, or the like.

Transaction device 107 comprises storage for software that, when executed, causes transaction device 107 to send and/or receive information from devices such as mobile device 101. In one example embodiment, the software may be operable to send and/or receive information from other devices using wireless protocols. For example, the software can be configured to enable transaction device 107 to send and/or receive information over a Bluetooth connection, over a wireless network connection (e.g., 802.11a/b/g/n), using Near-Field Communication (NFC), or other standard or proprietary communication protocol. The software may also be configured to enable sending information to mobile device 101 in a visual manner. For example, transaction device 107 may have functionality for displaying information encoded using a visual symbol displayed on transaction device 107 (such as a barcode or QR code), enabling mobile device 101 to capture an image and receive the encoded information.

Transaction device 107, in some embodiments, communicates with mobile device 101 using Near Field Communication (NFC) technology. NFC technology enables one- or two-way wireless communication between devices separated by a short distance. In some embodiments, NFC technology enables two devices to send data directly to each other. In other embodiments, NFC technology provides the devices the ability to set up, or "bootstrap," a wireless connection between the devices. The connection can be, for example, a Bluetooth connection, a Wi-Fi Direct connection, a Wi-Fi connection, or the like. After the connection between the devices is set up, the devices can send data to each other over that connection.

Mobile device 101 and transaction device 107 are not limited to using NFC or other local wireless connections to communicate directly with one another. For example, transaction device 107 and mobile device 101 may be configured to exchange data by communicating with a separate device connected to interbank network 105.

In some embodiments, a user may utilize keypad 107B to input data into transaction device 107, including user credentials associated with one or more accounts owned by the user. One of ordinary skill will appreciate that other input devices, such as biometric devices, also may be used to communicate data from the user to the transaction device.

Interbank network 105, sometimes called an ATM network, represents one or more electronic devices that provide functionality for a variety of financial transactions, such as ATM withdrawals. Interbank network 105 may enable multiple banks to access information and funds of accounts held by one another. Examples of payment networks include, e.g., NYCE Payments Networks, LLC's NYCE®, PayNet Payment Networks, LLC's PayNet™, and Interac Association's Interac®. Interbank network 105 may interconnect financial institutions, such as banks, to one another. Interbank network 105 may also comprises other interconnections, such as to ATMs, other interbank networks, or the like. In some embodiments, interbank network 105 may comprises more than one interbank network.

Two entities that have relationships with interbank network 105 are said to be "connected to" one another over interbank network 105. As an example, if a user having an account with a bank connected to interbank network 105 attempts to access an account at an ATM owned by another bank also connected to interbank network 105, each bank may communicate with the other using payment network 105 to complete the transaction. Interbank network 105 may operate domestically or internationally, across one or more countries, to allow communications between entities, such as banks, that are not located in the same country. This may be accomplished, for example, via connections through a gateway, other networks, or other payment networks. As another example, if a user having an account with a bank connected to interbank network 105 attempts to access an account at an ATM owned by another bank connected to another interbank network, each bank may communicate with their respective interbank network and the interbank networks may communicate with each other to complete the transaction.

Machine learning system 111 represents one or more electronic devices that provide functionality for a making predictions, decisions, or inferences based on data. Machine learning system 111 may include or one or more known processing devices, such as, for example, a microprocessor. In some embodiments, machine learning system 111 may include any type of single or multi-core processor, mobile device microcontroller, central processing unit, or any circuitry that performs logic operations. In operation, machine learning system 111 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in machine learning system 111, or elsewhere. Machine learning system 111 may be configured to receive input data from other devices such as processing device 103, mobile device 101, and the like.

Machine learning system 111 may be configured to execute computer instructions for a machine learning model. Machine learning model refers to a computational model or algorithm that is trained to perform a specific task without being explicitly programmed for that task using learned patterns and relationships to make predictions or decisions. In some embodiments, the machine learning model may be implemented as a large language model, such as GPT-3, GPT-4, BERT, XLNet, or the like. Large language model refers to a type of machine learning model designed to analyze, understand, and generate human-like language via natural language processing tasks.

In some embodiments, the machine learning model may be generated, seeded, and/or modified to be tailored to process data associated with financial systems, such as interbank networks, transaction devices, and the like. The machine learning model may be initially trained using a defined dataset. For example, the machine learning model may be initially trained using a dataset comprising defined business rules and analytical data derived based on business use cases. A business rule, in some embodiments, refers to a statement or constraint that defines or dictates a certain aspect of a business process. For example, a business rule may involve categorizing, sorting, or labeling financial transaction data (e.g., withdrawals, account numbers, debit card numbers) based on the financial institution and/or interbank network with which the data is associated. Analytical data, in some embodiments, refers to data that may be processed and transformed for the purpose of analysis. Analytical data may involve organizing, cleaning, and structuring raw data to extract meaningful insights. Analytical data derived based on business use cases may involve financial transaction data (e.g., withdrawals, account numbers, debit card numbers).

The machine learning model may be further trained to produce a desired output to a requestor. For example, the machine learning model may undergo supervised training during which the machine learning model is trained to produce only desired outputs. In some embodiments, the machine learning model may be configured to use previously inputted and/or collected data to improve future outputs. For example, the machine learning model may utilize information processed at mobile device 101, transaction device 107, or any other connected device to serve as a unique business scenario, which may improve the accuracy of future output data.

Machine learning system 111 may be configured to receive and analyze input data from other devices such as processing device 103, mobile device 101, and the like. The input data may be used as an input to the machine learning model. Input data may include a request comprising at least one constraint. In some embodiments, the at least one constraint may include at least one of: a bank associated with the user, a location, a total amount of currency, or a breakdown of the total amount of currency by denomination.

In some embodiments, machine learning system 111 may be trained to determine with which interbank network the request is associated. For example, during the training process of machine learning system 111, data associated with banks and interbank networks may be used as training data. The constraint of a bank associated with the user may involve a debit card number or account number associating the user with a specific bank or financial institution. In some embodiments, the machine learning model may determine the associated bank using an Issuer Identification Number (IIN) or Bank Identification Number (BIN) of a debit card number. Debit card numbers typically start with a short (e.g., six, eight, or any number between one and eleven) numerical sequence associated with a specific bank or financial institution (i.e., IIN or BIN). The machine learning model may be trained to identify the BIN and compare the BIN against a database comprising a list of BINs and their respective financial institution or bank. In some embodiments, the machine learning model may determine the associated bank using an account number associated with the user. The database may further comprise a list of American Bankers Association (ABA) numbers, International Bank Account Number (IBAN), Bank Identifier Code (BIC)/SWIFT code, or routing numbers and their respective financial institutions. The machine learning model may be trained to identify the financial institution associated with an account number and compare against a database comprising a list of ABA numbers and their respective interbank networks. Further, the database may comprise a list of financial institutions or banks and their associated interbank networks. For example, the machine learning model may receive a request from processing device 103 originating from mobile device 101 comprising at least a debit card number. The machine learning model may read and interpret the debit card number to identify the BIN and an associated bank. The machine learning model may further identify an associated interbank network with the associated bank. For example, the machine learning model may receive an account number, identify with which bank the account number is associated, identify the associated ABA number of the bank, and determine the interbank network associated with the bank.

In some embodiments, machine learning system 111 may involve a classification engine stored in one or more memories of one or more computing devices. The classification engine refers to a component or model that is trained to categorize input data into predefined classes or categories. The classification engine may be implemented as part of the machine learning model or as a separate independent model that is configured to communicate or interface with the machine learning model. The classification engine may be configured to receive a training dataset tailored to a particular domain or application, such as financial or banking information. The training dataset may involve data associated with banks and interbank networks. The classification engine may be configured to receive the request. In some embodiments, the classification engine may be configured to determine with which interbank network the request is associated. In some embodiments, the classification engine may receive the request originating from mobile device 101 and classify the request as associated with an interbank network based on at least one constraint, such as the constraint of a bank associated with the user. For example, the classification engine may receive a request comprising at least a debit card number. The classification may, based on the training dataset, determine the BIN, associated bank, and associated interbank network for the request. Machine learning system 111 may send determined information to the user through processing device 103 to be displayed on mobile device 101.

In some embodiments, machine learning system 111 may be trained to generate responses specific to the determined interbank network or bank to be displayed on mobile device 101. For example, if the machine learning model determines based on input data that the request is associated with interbank network A and bank X, machine learning system 111 may generate a prompt or response for display on mobile device 101 tailored to interbank network A and bank X and exclude information that may be specific to interbank network B or bank Y. Further, bank X does not offer a service that bank Y offers, machine learning system 111 may generate a prompt for the user that does not include that service, but may generate a different prompt that does include that service for a user whose request is determined to be associated with bank Y.

In some embodiments, the machine learning model may be trained to generate a command to be sent to the determined interbank network. The command may involve instructing the interbank network to query a number of connected transaction devices for data. The command may be sent to the interbank network directly, via a processing device, or any other number of intermediate devices. The data may involve a location associated with the transaction device, also referred to herein as a transaction device location, and a number of each denomination of currency available for withdrawal at the transaction device. In some embodiments, machine learning system 111 may be configured to receive and store the queried data from the interbank network.

In some embodiments, the machine learning model may be configured to determine the closest transaction devices based on the constraint of location of the request, or user location. The user location may involve at least one of: latitude and longitude coordinates, an address, or postal code. In some embodiments, the machine learning model may be trained to calculate the distance between the user location and transaction device location. For example, the machine learning model may use a mathematical formula such as the Haversine formula to calculate the distance. In other embodiments, the machine learning model may be configured to communicate with and utilize other application programming interfaces (APIs), such as Google Maps API and the like, to determine the distance between the user location and transaction device location. Closest transaction devices may refer to all transaction devices that are within a range of distances from the user location (e.g., 1 mile, 2 miles, 5 miles, or any other distance). The range may be predetermined to reduce load on the interbank network. For example, only querying the closest transaction devices and not querying all connected transaction devices can result reduced traffic, lower processing overhead, increased resource conservation, and the like, for the interbank network. In some embodiments, the machine learning model may be trained to generate a command to the interbank network to only query connected transaction devices within the range.

In some embodiments, the machine learning model may be trained to determine at least one transaction device of the transaction devices queried by the interbank network that can service the request. Determining whether a transaction device can service the request, in some embodiments, may comprise determining how many of the constraints of the request are satisfied and how well the constraints of the request are satisfied. In some embodiments, the machine learning model may perform this determination by calculating a score for each transaction device queried by the interbank network and received by machine learning system 111. The machine learning model may be trained to generate an ordered or ranked list of the transaction devices such that the first elements of the list satisfy the constraints of the request better than the last elements of the list, as determined by the machine learning model.

In some embodiments, the machine learning model may be configured to perform this determination by applying a series of at least one filter and/or weighting system to a database that comprises transaction devices.

The machine learning model may apply a first filter based on location. For example, the machine learning model may determine the nearest proximity transaction devices based on the user location and create a sorted list comprising nearest transaction devices to the user location to farthest transaction devices to the user location. The machine learning model may also apply a weight to each element in the sorted list. For example, the machine learning model may weight each element in the sorted list such that to most highly ranked transaction devices connected to an interbank network associated with the user's bank, more highly ranked transaction devices connected to an interbank network associated with the partner banks of the user's bank, and least highly ranked transaction devices connected to any other interbank network. A partner bank may refer to a financial institution with which the user does not have an account and/or a relationship by any direct agreement or by any service disclosure, but a relationship established indirectly via an internal agreement between the user's bank and service offering bank (referred to herein as a "Partner bank" or an "interbank network bank").

The machine learning model may then apply a second filter to identify non-operational transaction devices. The machine learning model may also apply a weight to the identified non-operational transaction devices such that they rank last in the sorted list. For example, the machine learning model may weight non-operational transaction devices last in the sorted list behind all other operational transaction devices. The machine learning model may further apply a filter to determine which transaction devices have the requested denominations available for withdrawal. The machine learning model may also apply a weight to each transaction device with the requested denominations available for withdrawal to rank them more highly, along with an additional filter that determines which is the closest proximity device for the user to complete the desired transaction and/or service. For example, the machine learning model may weigh transaction devices with the requested denominations available for withdrawal such that they rank more highly.

Machine learning system 111 may send the sorted list of transaction devices to mobile device 101 directly, via processing device 103, or via any other intermediate device.

In some embodiments, machine learning system 111 may be configured to receive data from other devices. The data may include the request. In some embodiments, the request may comprise free form text. In other embodiments, the request may comprise spoken language. Receiving data, as used herein, may refer to accepting, taking in, admitting, gaining, acquiring, retrieving, obtaining, reading, accessing, collecting, or any operation for inputting the data. The machine learning model may be configured to accept free form text, spoken language, or a combination of free form text and spoken language as inputs.

One of ordinary skill will understand that the functionality of processing device 103, interbank network 105, and machine learning system 111 may be combined into a single device or set of electronic devices.

Bank 109 represents a bank or other deposit institution. Domestic bank 109 may have one or more accounts, such as deposit accounts, checking accounts, savings accounts, credit accounts, mortgages, Certificates of Deposit (CDs), or the like. These accounts may be located at, owned by, or administered by domestic bank 109 who may hold them on behalf of one or more users. In some embodiments, users may utilize the disclosed systems and methods to effect withdrawal transactions.

Figure 4:
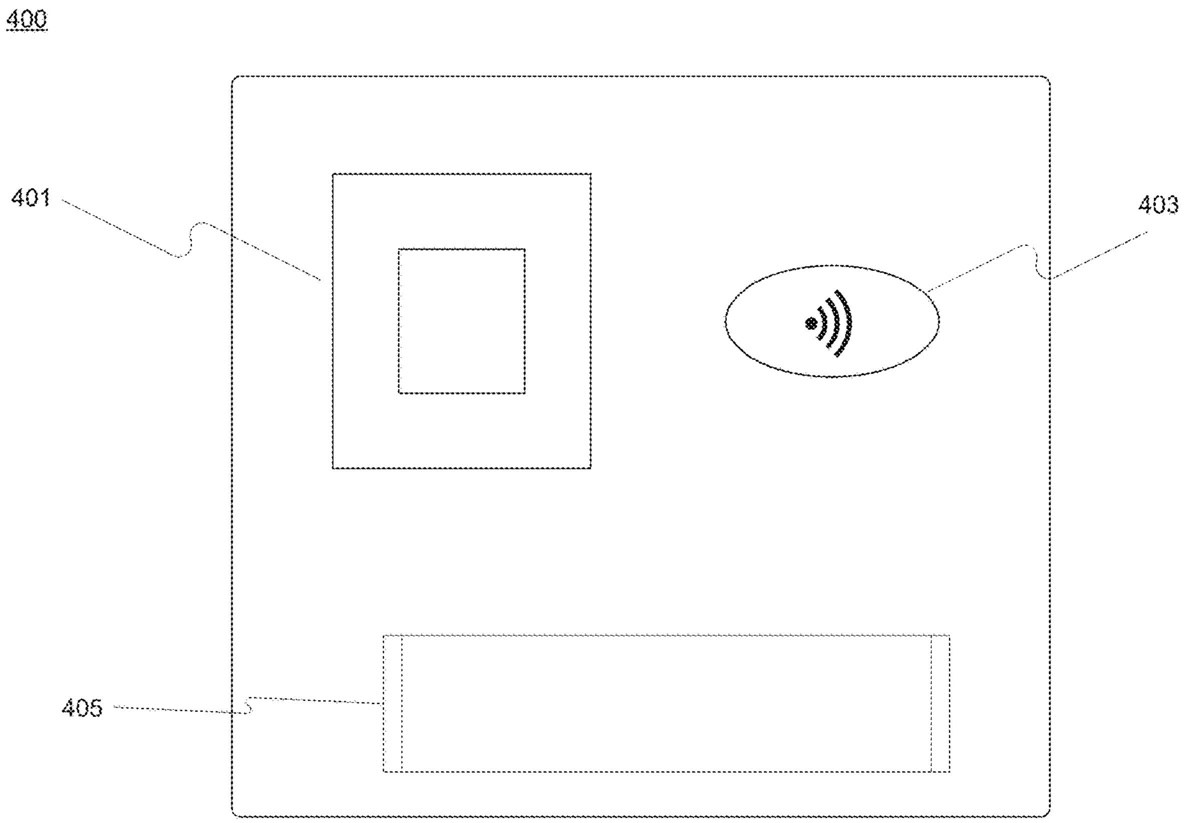
FIG. 4 is an example of a touchless ATM system for use in implementing the disclosed embodiments, consistent with disclosed embodiments.

FIGS. 2A-2F show illustrations of user interfaces for completing a transaction using mobile device 101 and transaction device 107. One of ordinary skill will understand that a variety of connections may be used to transmit data between transaction device 107 and mobile device 101, such as both devices communicating with a server connected to interbank network 105, 802.11 wireless (Wi-Fi) connections, Bluetooth connections, Near-Field Communication (NFC), other types of wireless connections, or wired connections. One of ordinary skill will also understand that in some embodiments a visual symbol, such as a one- or two-dimensional barcode or other symbol, may be used to communicate data between transaction device 107 and mobile device 101 (e.g., by displaying such a symbol on a screen of mobile device 101 for capture by a camera attached to transaction device 107). Exemplary process flows using the interfaces depicted in FIGS. 2A-2F are illustrated in FIG. 4.

Figure 2A:
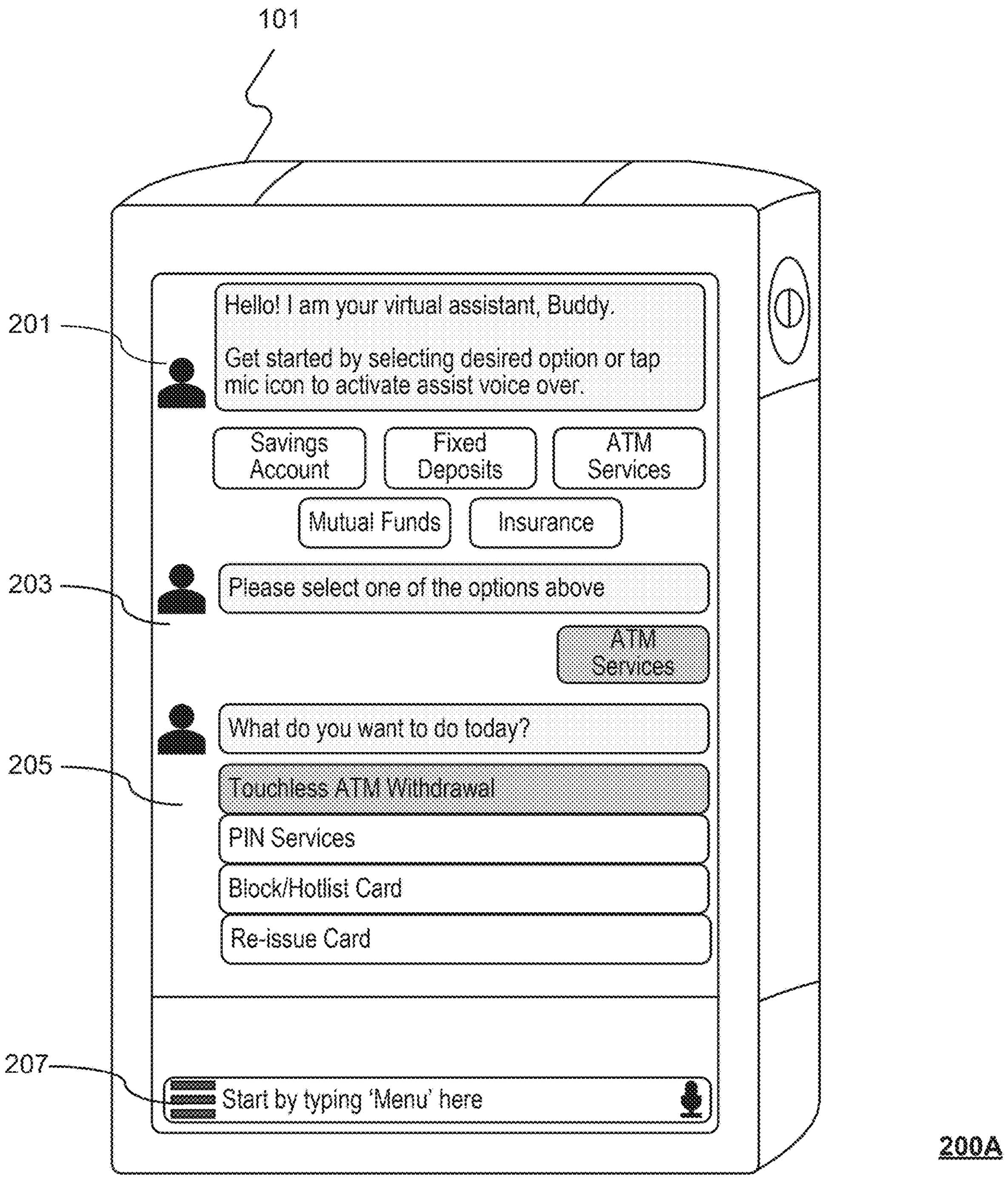
FIGS. 2A-2F are example processes for initiating a transaction using a mobile device, consistent with disclosed embodiments.

FIG. 2A shows exemplary illustrations of user interfaces 200A for performing a transaction using mobile device 101 and transaction device 107, consistent with disclosed embodiments. Processing device 103 receives and stores a request including an indication of the selected account and transaction.

For example, the user may have pressed a button displayed on a touchscreen of mobile device 101, opened an application on mobile device 101, utilized a voice command system to initiate the transaction, or the like. In addition, the user may also have interacted with transaction device 107. For example, the user may have pressed buttons displayed on a touchscreen of transaction device 107 that represent a particular transaction and a desire to initiate the transaction using mobile device 103.

Transaction device 107 and mobile device 101 may communicate with one another using a server (e.g., an electronic device) connected to interbank network 105. As one example, mobile device 101 and transaction device 107 may both communicate with a device such as processing device 103 or interbank network 105, in order to communicate information concerning the requested transaction from mobile device 101 to transaction device 107 and vice versa.

In example FIG. 2A, a user has initiated a transaction request using mobile device 101. Prompts to the user may be made interchangeably upon the mobile device and the transaction device in various embodiments within the scope of the invention. Prompt 201 is an exemplary text prompt displayed on mobile device 101 that lists available options. Options may include Savings Account, Fixed Deposits, ATM Services, Mutual Funds, and Insurance. Savings Account may refer to a type of bank or financial institution account that is designed to help people save money over time while earning interest. Fixed Deposits may refer to a type of bank or financial institution account that is a tenured deposit account that provides a higher rate of interest compared to a savings account. ATM Services may refer to a set of banking or financial transactions that can be performed at an ATM. Mutual Funds may refer to a type of financial account that allows individuals and investors to pool their money with others to invest in a diversified portfolio of stocks, bonds, or other securities. Insurance may refer to a bank or financial institution account dedicated to insurance-related funds. Insurance accounts may include an insurance premium account, insurance escrow account, insurance settlement account, or the like.

Prompt 203 is an exemplary text prompt displayed on mobile device 101 that instructs the user to select one of the displayed options in prompt 201. Prompt 205 is an exemplary text prompt displayed on mobile device 101 that lists available transactions associated with the user-selected option from prompt 203 and instructs the user to select a transaction. For example, as depicted in FIG. 2A, if a user selects the ATM Services option, the available transactions may include Touchless ATM Withdrawal, PIN Services, Block/Hotlist Card, and Re-issue Card. Touchless ATM Withdrawal may involve withdrawing funds from an account as cash at an ATM. PIN Services may involve changing a PIN associated with a user's debit card, requesting a temporary PIN, and the like. Block/Hotlist card may involve communicating with a bank to prevent any future transactions using a user's debit card. Re-issue card may involve a user requesting that a bank send the user a new debit card. Other transactions, such as cash deposits, purchases, payments (including bill payments), check-cashing, fund transfers (including loading or reloading a prepaid account), may be possible as well.

In other embodiments not depicted, mobile device 101 may display different transactions for each option in prompt 201. For example, if the user selected Savings Account, prompt 205 may include the transactions Deposit Funds, Transfer Funds, Wire Transfer, and the like.

As depicted in FIGS. 2A-2F, mobile device 101 may display menu bar 207. Menu bar 207 may involve an interactable menu icon, interactable text field, and interactable voice icon. The interactable menu icon may open a list of menu options when a user interacts with it. The menu options may include settings, help and support, logout, and the like. The interactable text field, which may also be referred to as an input field or text input field, may involve a user interface element that allows users to input text or data. For example, a user may input text associated a menu option to instruct mobile device 101 to display that menu option. The interactable voice icon may, when a user interacts with it, access a microphone connected to mobile device 101 and allow the user to input spoken language into the interactable text field. In some embodiments, the interactable voice icon may be used to indicate user selections to prompts displayed on mobile device 101, such as prompt 203, prompt 205, and the like.

Figure 2B:
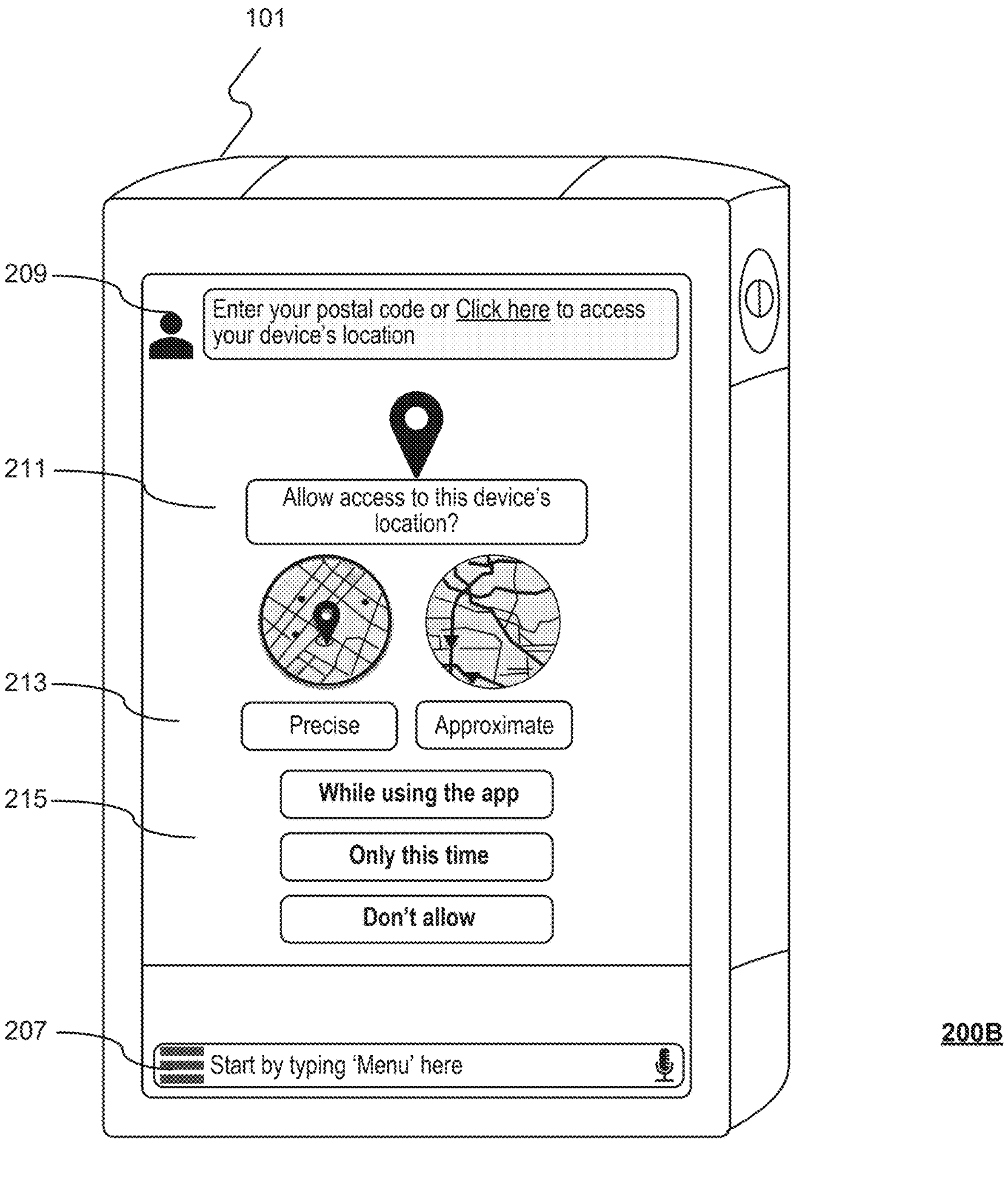

FIG. 2B shows illustrations of user interfaces 200B for processing a transaction using a mobile device 101 and a transaction device 107, consistent with disclosed embodiments. Processing device 103 receives and stores a request including an identifier associated with the user's location.

Prompt 209 instructs the user to enter a postal code or allow processing device 103 access to the location of mobile device 101. As depicted in FIG. 2B, if a user selects to allow access to the location of mobile device 101, prompt 211 will be displayed on mobile device 101 and confirm that selection. Allowing access to the user device's location may involve to a combination of hardware and software to determine the geographical location of a device, such as mobile device 101. Determining the user device's location may involve determining location data from global positioning system (GPS), Wi-Fi positioning, cellular triangulation, and the like. Location data may include GPS coordinates, an address, or the like. Location data may be sent to and stored in processing device 103, machine learning system 111, or any other device that may use the location data to determine nearby transaction devices. Machine learning system 111 may use the location data to determine which transaction devices are nearest, as exemplified and described elsewhere herein. Processing device 103 may be configured to use the location data to determine which transaction devices area nearest in a similar manner to machine learning system 111.

Prompt 213 instructs the user to indicate if the mobile device's location should be precise or approximate. A precise mobile device location refers to the specific and accurate geographical coordinates of the device and typically includes latitude and longitude coordinates. An approximate mobile device location refers to a more general location, such as a region, city, postal code, or the like.

Prompt 215 instructs the user to indicate if the access to the mobile device's location only while initiating transactions, only while initiating this transaction, or not at all.

In some embodiments not depicted, if a user selects to enter a postal code, mobile device 101 may display a text field into which a user may enter a postal code. In other embodiments, mobile device 101 may prompt the user to enter a location identifier, such as an address, an intersection, a landmark, a city, and the like. Further, mobile device 101 may display a map showing a region around the location identifier and instruct the user to indicate a location on the map to be designated as the mobile device's location.

Figure 2C:
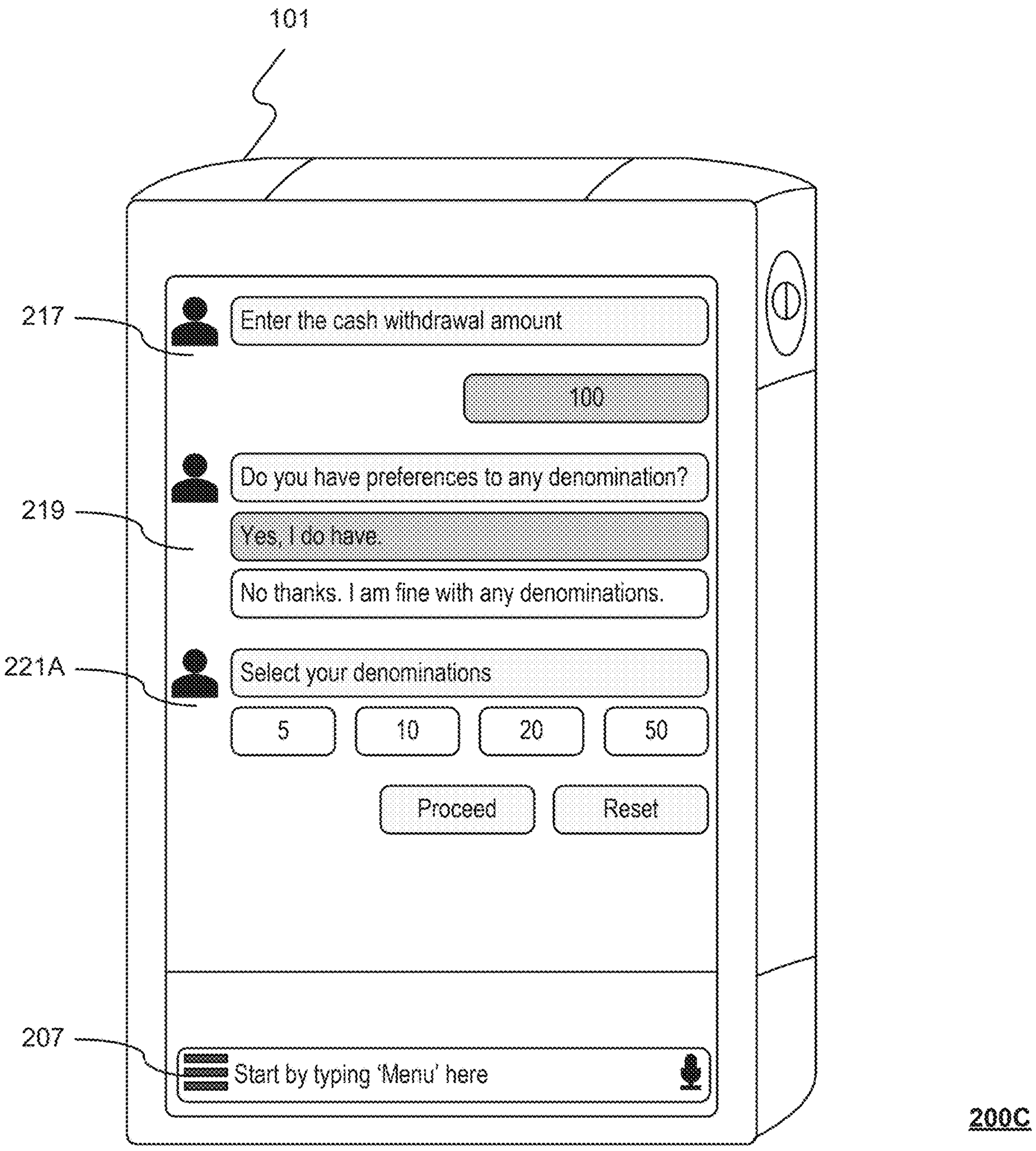
Figure 2D:
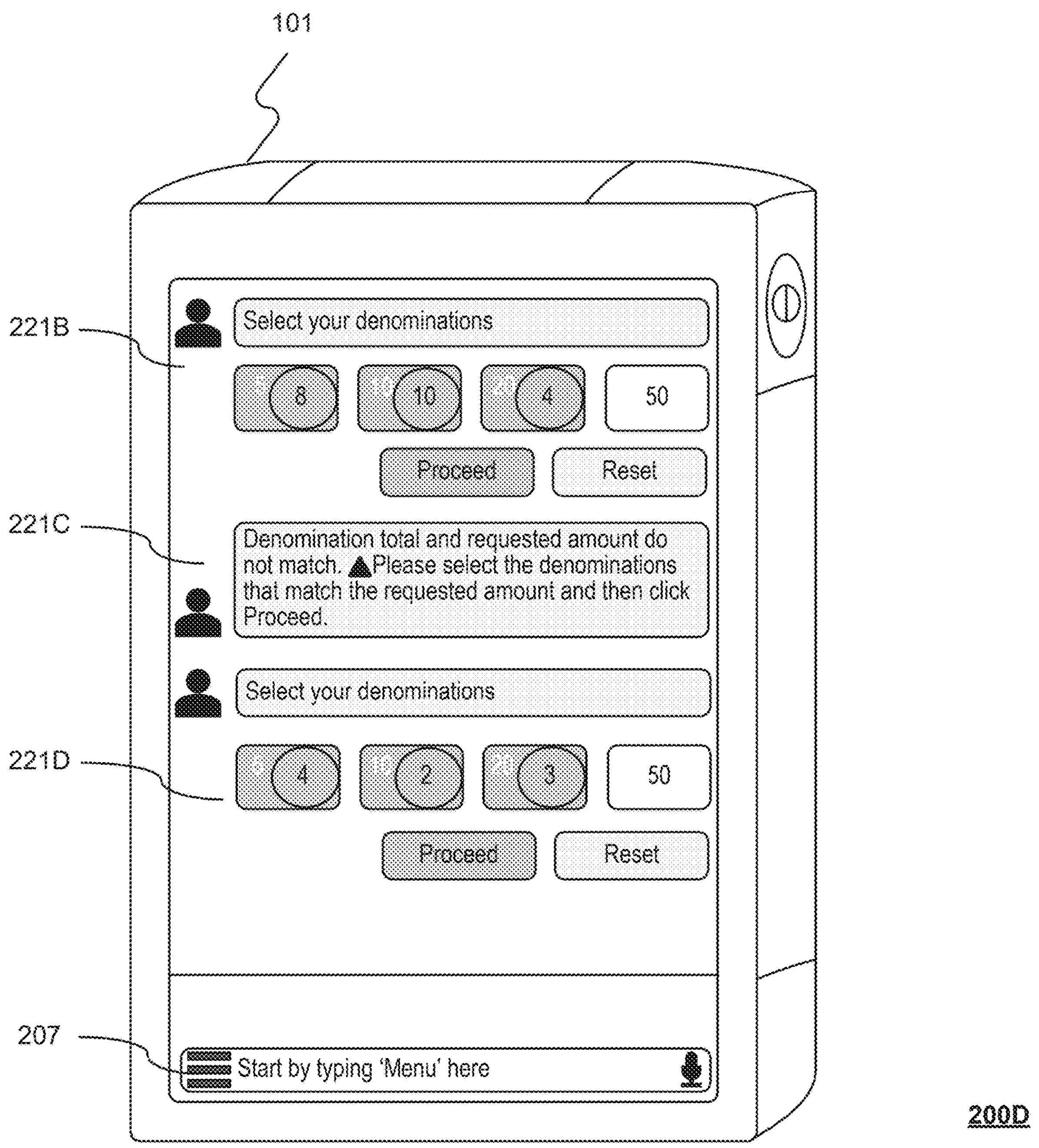

FIGS. 2C and 2D show exemplary illustrations of user interfaces 200C and 200D for performing a transaction using mobile device 101 and transaction device 107, consistent with disclosed embodiments. Processing device 103 receives and stores a request including a value associated of the total amount of currency and values associated with a breakdown of the total amount of currency by denomination.

As depicted in FIG. 2C, mobile device 101 may display prompt 217 instructing the user to input an amount of currency for cash withdrawal. In some embodiments, mobile device 101 may provide a text input field into which a user may type an amount of currency. In other embodiments, mobile device 101 may provide a stepper, slider, picker, keypad, or the like that the user may interact with to input the amount of currency. A stepper, or spinner, refers to increment and decrement buttons to adjust numeric values. A slider involves a user to select a numeric value by dragging a slider control along a value scale. A picker, or dropdown, refers to a menu that may display a list of numeric options from which the user may choose. A keypad, or numpad, may involve large buttons or icons for entering numbers. Mobile device 101 may send the total amount of currency to processing device 103, machine learning system 111, or any other intermediate device to be stored as a constraint of the request.

Prompt 219 instructs the user to indicate if the user has a preference to any denominations. Preference to denomination may include a breakdown of the total amount of currency inputted in response to prompt 217 by the number of each denomination of currency the user wants. If the user indicates no preference to prompt 219, mobile device 101 may skip prompts 221A to 221D and proceed to displaying prompt 223. Mobile device 101 may send the indication of preference to denomination or no preference to denomination to processing device 103, machine learning system 111, or any other intermediate device as a constraint of the request.

Prompt 221A instructs the user to select which denominations of currency should comprise the total amount of currency to be withdrawn. Prompt 221A may include interactable display icons for different denominations of currency. For example, prompt 221A may include interactable display icons for five-dollar bills, ten-dollar bills, twenty-dollar bills, and fifty-dollar bills. Prompt 221A may further comprise a proceed option and reset option. The proceed option may confirm the user's selection of each number of each denomination of currency. The reset option may reset the user's selection to zero for each denomination of currency.

As depicted by FIG. 2D, prompt 221A may become prompt 221B after the user has indicated a number of at least one denomination. The user may select any denomination icon to input what number of that denomination the user desires. The user may input the number using a text field, stepper, slider, picker, dropdown, or the like. Mobile device 101 may send the number of each denomination of currency to processing device 103, machine learning system 111, or any other intermediate device. That device may verify that the sum of each number of each denomination of currency is monetarily equal to the total amount of currency. For example, the user may input 8 five-dollar bills, 10 ten-dollar bills, and 4 twenty-dollar bills into prompt 221B. Mobile device may then send data containing that inputted information to processing device 103.

In some embodiments, if the sum and the total amount of currency do not match, that device may send instructions to mobile device 101 to display prompt 221C. For example, processing device 103 may calculate and determine that the received data is not monetarily equal to the stored data associated with the total amount of currency to be withdrawn. Processing device 103 may then send instructions to mobile device 101 to display prompt 221C and a new prompt 221B. In other embodiments, mobile device 101 may be configured to perform the verification locally. Mobile device may display prompt 221C to inform the user that the denomination total and requested amount do not match and may display a new prompt 221B to the user.

Figure 2E:
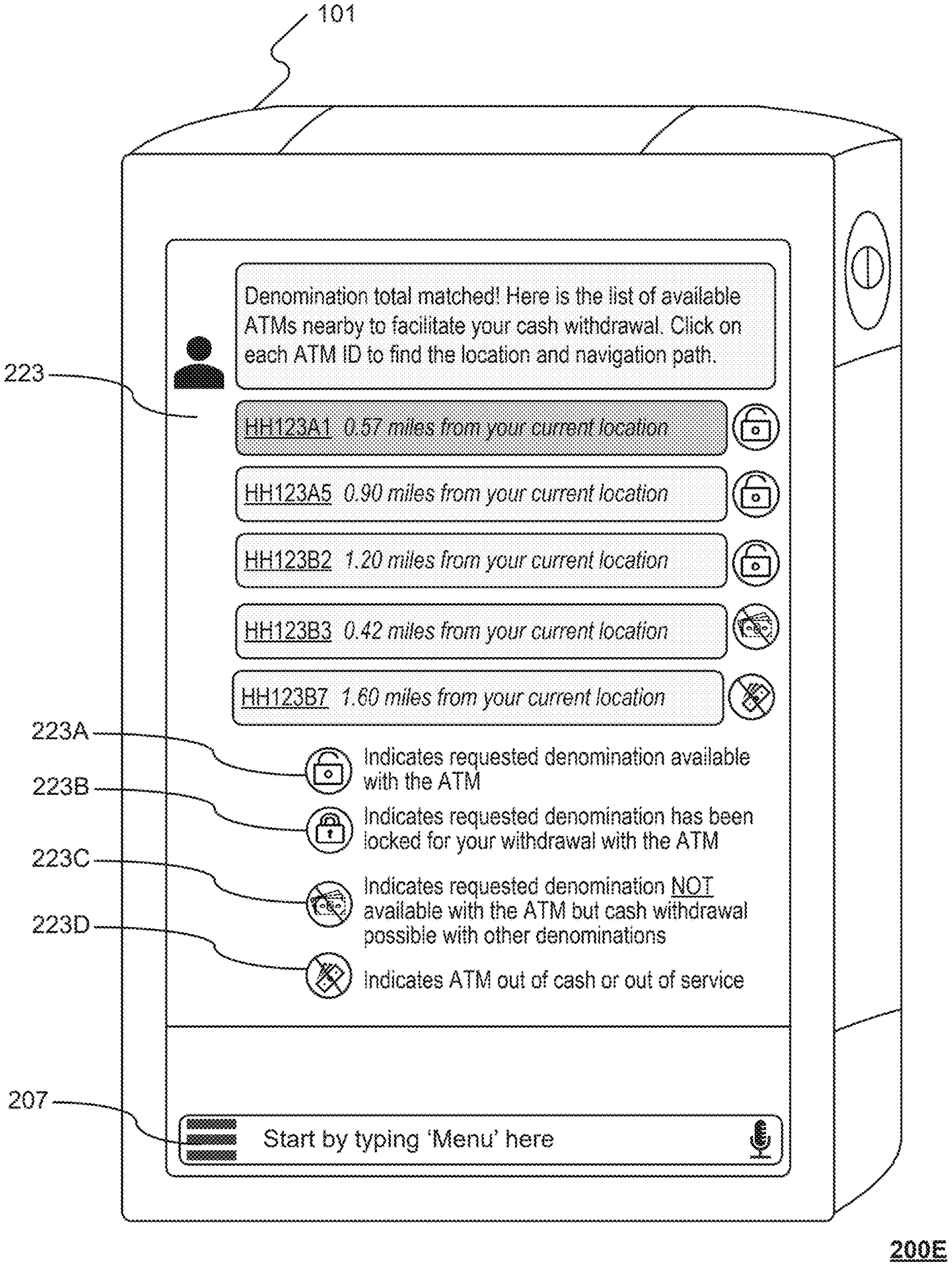

FIG. 2E shows an exemplary illustration of user interface 200E for performing a transaction using mobile device 101 and transaction device 107, consistent with disclosed embodiments.

Figure 3:
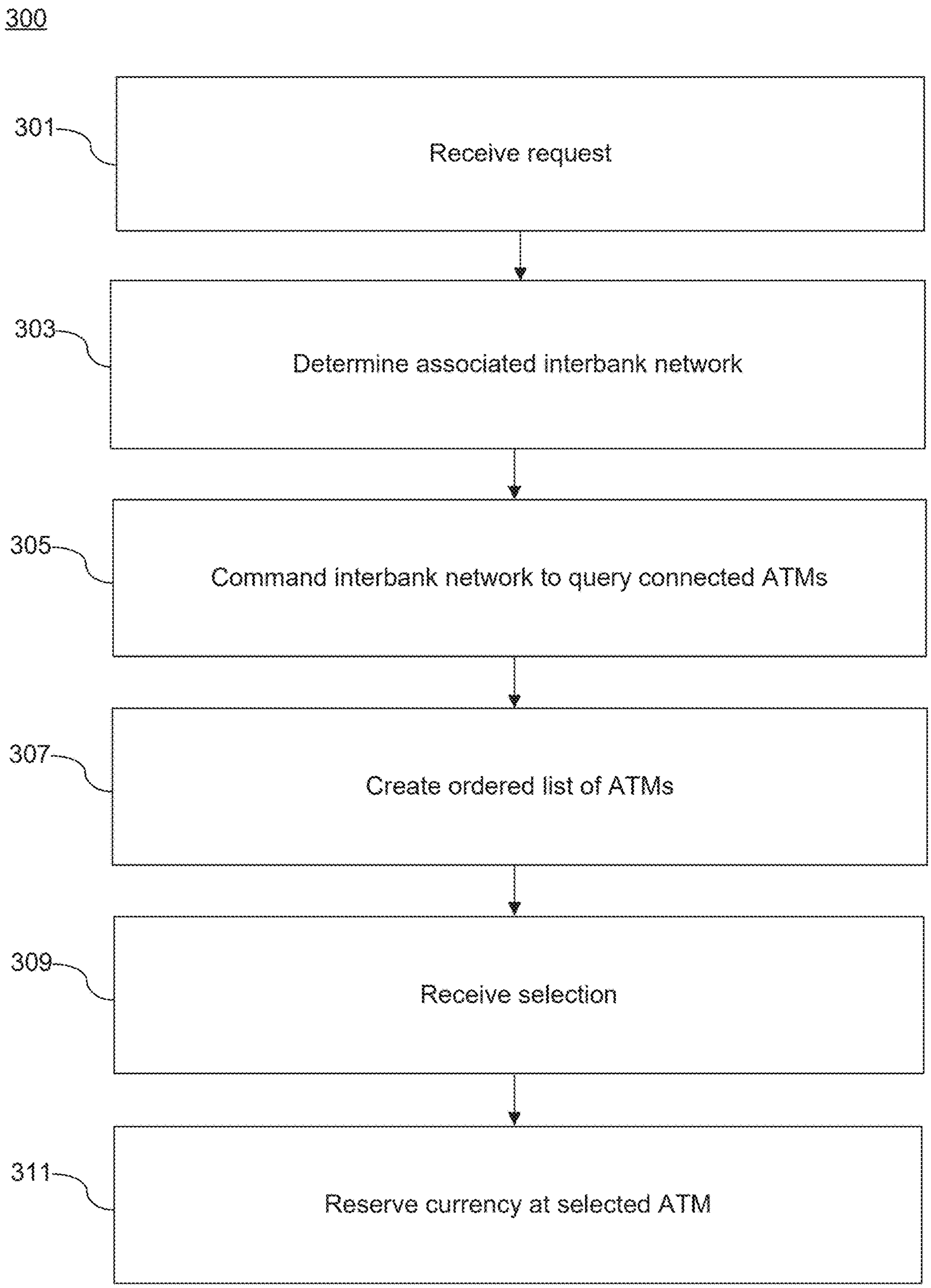
FIG. 3 is an example process for processing a transaction using a processor, consistent with the disclosed embodiments.

Mobile device 101 may display prompt 223 after processing device 103 performs step 307 as depicted in FIG. 3 and detailed below.

Prompt 223 may include a list of at least one transaction device that processing device 103 or machine learning system 111 has determined satisfies the at least one constraint of the request. Each element of the list may include a unique alphanumeric identifier associated with a particular transaction device, a distance between the user device location and the transaction device location, and an indication associated with the transaction device. The unique alphanumeric identifier may refer to an ATM ID and may be used to differentiate one transaction device from another within an interbank network. Machine learning system 111 may determine the distance using the Haversine formula, a location API (e.g., Google Maps API), or any other means of determining the distance between two defined points. In some embodiments, the indication associated with the transaction device may include one of the group consisting of: requested denomination available with the transaction device, requested denomination is not available with the transaction device but cash withdrawals possible with other denominations, or transaction device out of cash or out of service momentarily. In other embodiments, the indication may further include: transaction device is not connected to an interbank network associated with the user as determined by processing device 103 or machine learning system 111, transaction device is inside a building, and transaction device may charge a service fee. The above lists of indications is merely exemplary and may include other not-listed indications.

Mobile device may display an icon associated with each indication, as depicted in FIG. 2E. Further, mobile device may display a key or legend explaining with which indication each icon is associated. Icon 223A is associated with the indication that the requested denominations are available with the ATM. Icon 223B is associated with the indication that the requested denomination has been locked for your withdrawal with the ATM. Icon 223C is associated with the indication that the requested denomination is not available with the ATM but cash withdrawal is possible with other denominations. Icon 223D is associated with the indication that the ATM is out of cash or out of service.

Figure 2F:
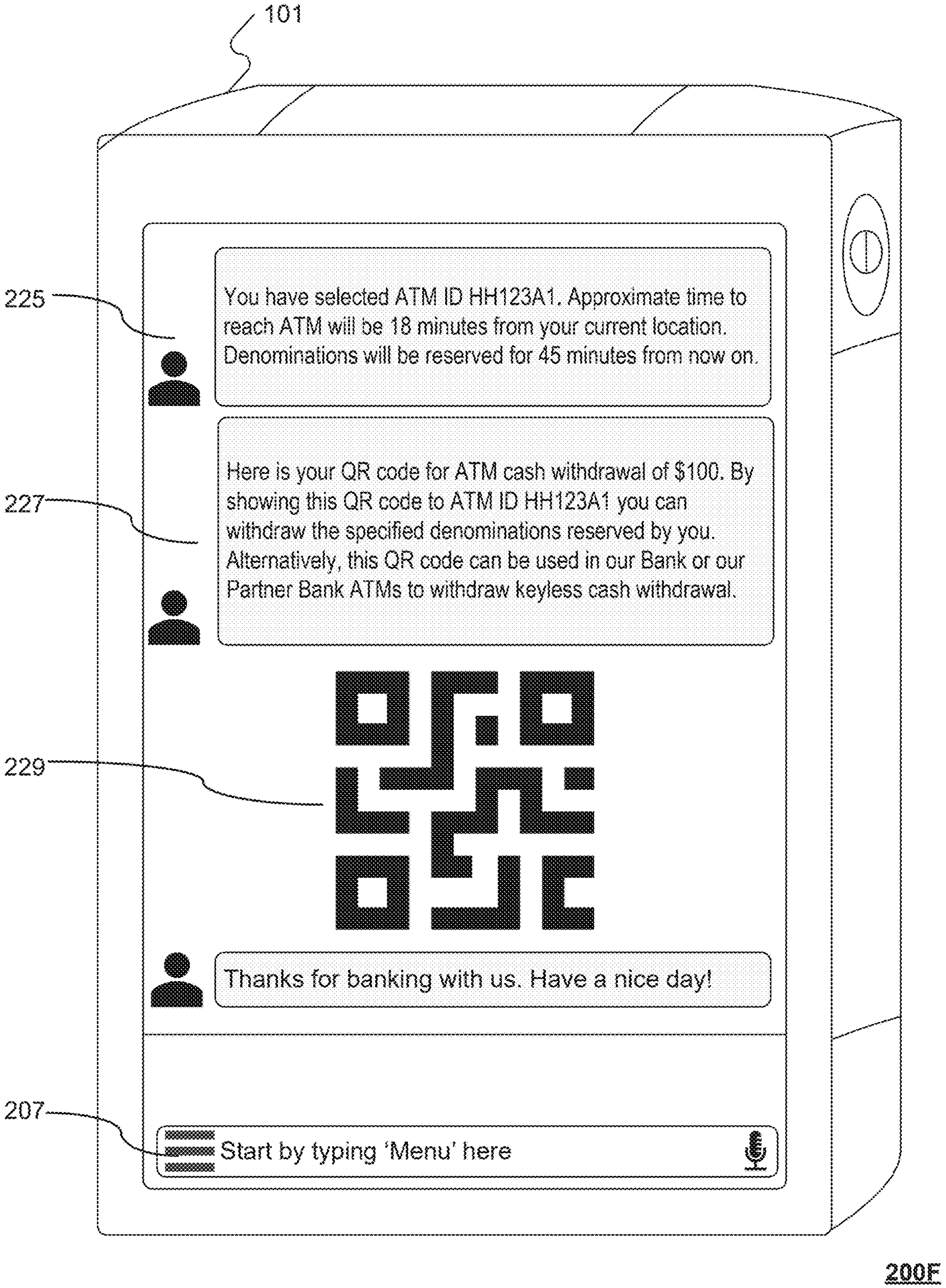

FIG. 2F shows an exemplary illustration of user interface 200F for performing a transaction using mobile device 101 and transaction device 107, consistent with disclosed embodiments.

After the user selects an element of the list from prompt 223 displayed on mobile device 101, mobile device may send the selection to processing device 103, machine learning system 111, or any other intermediate device. Mobile device 101 may display prompt 225 after processing device performs step 311 as depicted in FIG. 3 and detailed below. Prompt 225 involves displaying a confirmation message to the user on mobile device 101. The confirmation message may involve informing the user which transaction device the user selected, an estimated time to travel to the selected transaction device, and how long the currency will be reserved for the user at the selected transaction device. In some embodiments, processing device 103 may send data to mobile device 101 associated with the information displayed in prompt 225, such as the estimated time to travel. In other embodiments, mobile device 101 may be configured to estimate time to travel locally. Mobile device 101 may perform the estimation by using the user device location and transaction device location in conjunction with a location API (e.g., Google Maps API). For example, mobile device 101 or processing device 103 may instruct Google Maps API to determine and provide a travel route from the user device location to the transaction device location.

Figure 5:
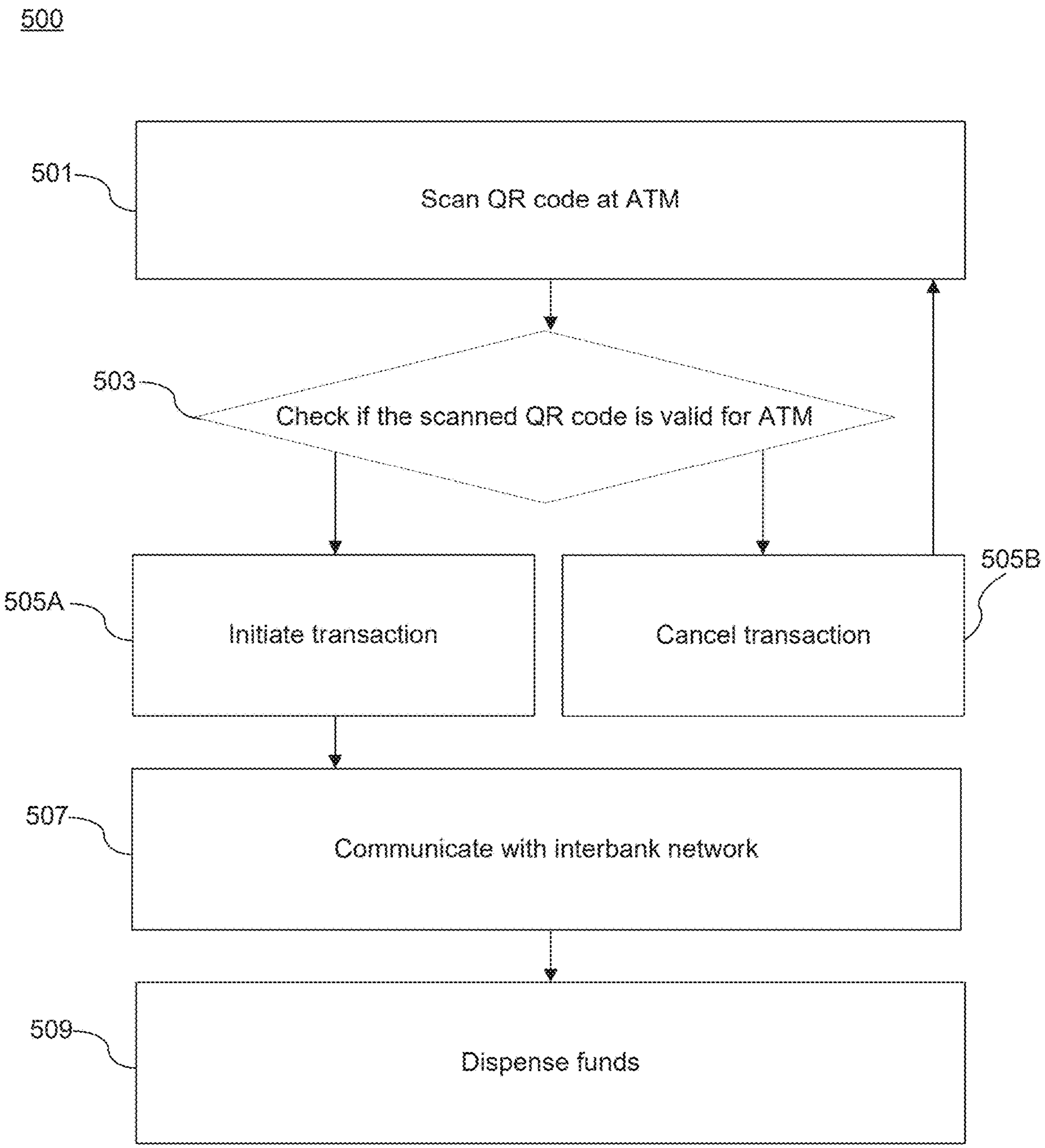
FIG. 5 is an example process for processing a transaction using a touchless transaction device, consistent with the disclosed embodiments.

Mobile device 101 may display prompt 227 after prompt 225. Prompt 227 involves informing the user that the amount of currency of the request is reserved at the selected transaction device. Prompt 227 may further involve QR code 229. In some embodiments, QR code 229 may contain data to initiate or complete a transaction at the selected transaction device 107, such as the request. Transaction device 107 may scan or read QR code 229 to take in the information, such as in step 501 as depicted in FIG. 5 and detailed below. In other embodiments, QR code 229 may contain data to initiate or complete a transaction at any transaction device 107 connected to interbank network 105. Processing device 103 may generate and send QR code 229 to mobile device 101 as part of step 311 as depicted in FIG. 3 and detailed below.

FIG. 3 is an example process 300 for processing a transaction using a processing device, consistent with the disclosed embodiments. While the steps of process 300 are described below as being operated on processing device 103, in some embodiments, one or more steps of process 300 may be operated by other devices, such as mobile device 101, machine learning system 111, bank 109, or transaction device 107.

In step 301, processing device 103 receives a request from mobile device 101. The request refers to a transaction the user wishes to perform at a transaction device 107, such as a cash withdrawal. In some embodiments, the request may involve at least one constraint. The at least one constraint may comprise at least one of: a bank associated with the user, a location associated with the user, a total amount of currency, or a breakdown of the total amount of currency by denomination. Processing device 103 may store the request in a data structure, such as an array, linked list, or the like, to improve efficiency in data retrieval, modification, or deletion. For example, processing device 103 may be configured to store the request in an array, with each element of the array corresponding to a constraint of the request. In some embodiments, processing device 103 may store each received request in a different data structure. In other embodiments, processing device 103 may store a plurality of requests in the same data structure. For example, processing device 103 may store all requests from a single day in a single data structure.

In step 303, processing device 103 may determine which interbank network is associated with the request. In some embodiments, processing device 103 may communicate with a database involving a data structure, such as a lookup table, that associates values, such as BINs, with their respective interbank network. The data structure may further involve a value for each interbank network indicating how many transaction devices are connected, the region(s) each interbank network services, or the like. The database may be incorporated as part of processing device 103 or as part of a separate, independent device or server. For example, processing device 103 may retrieve the constraint of the request comprising the bank associated with the user and query the database to retrieve the corresponding interbank network. Processing device 103 may store the received data involving the corresponding interbank network in the same data structure that stores the request.

In other embodiments, processing device 103 may communicate the request with machine learning system 111 to determine the associated interbank network. Processing device 103 may retrieve and send the constraint associated with the bank to machine learning system 111. Machine learning system 111 may input the constraint into the machine learning model to determine the associated interbank network. Machine learning system may send data involving the corresponding interbank network to processing device 103. Processing device 103 may store the received data in the same data structure that stores the request.

In step 305, processing device 103 may command the associated interbank network to query some or all connected Transaction devices 107 for data. The data may comprise the number of each denomination of currency that is available for transactions at transaction device 107 and the geographical location of transaction device 107. Processing device 103 may store the queried data in a data structure, such as an array. In some embodiments, the data structure may be the same data structure that stores the request. In other embodiments, the data structure may be a different data structure.

In some embodiments, processing device 103 may command interbank network 105 to query only connected Transaction devices 107 within a certain distance range (e.g., 5 miles, 10 miles, or any other determined distance) for data. In some embodiments, the distance range may be predetermined to reduce load on the interbank network. In other embodiments, the range may be a constraint of the request and determined by the user.

It may be advantageous to the user to perform the transaction with a transaction device 107 connected to an associated interbank network because transactions with a Transaction device connected to a non-associated interbank network may involve additional fees, such as transaction fees, that a user may wish to avoid paying if possible. However, in some embodiments, if no transaction device 107 connected to the associated interbank network 105 satisfy any of the constraints of the request, processing device 103 may determine a non-associated interbank network instead. Determining the non-associated interbank network to query may involve processing device 103 querying the database for a different interbank network. In some embodiments, processing device 103 may query the database for an interbank network that has the most connected transaction devices. For example, if after receiving data from all queried Transaction devices 107 from interbank network 105, processing device 103 determines that no Transaction devices 107 satisfy any of the at least one constraint, in part or in total, processing device 103 may go back to step 303 to determine another interbank network to command.

In step 307, processing device 103 may create an ordered or ranked list of connected Transaction devices 107. In some embodiments, processing device 103 may calculate and assign a score based on how well each transaction device 107 satisfies the at least one constraint or how many of the at least one constraint each transaction device 107 satisfies. In some embodiments, processing device 103 may apply a series of at least one filter and/or weighting system to a data structure comprising a list of transaction devices to create the ordered list.

In some embodiments, calculating the score may involve assigning a value to each constraint of the request. For example, the location constraint's score may be equal to the inverse of calculated distance between the user device location and the transaction device location such that transaction devices 107 that are farther from the user device location have a lower score. Further, the bank constraint's score may be equal to 0 if a transaction device 107 is not connected to an associated interbank network and 1 if a transaction device 107 is connected to an associated interbank network. Further, if a transaction device 107 contains an amount of currency available for transactions that is greater than or equal to the constraint associated with the total amount of currency, the amount constraint's score may be 1. If a transaction device 107 contains an amount of currency available for transactions that is less than the constraint associated with the total amount of currency, then the amount constraint's score may be 0. Further, the denomination constraint's score may be equal to the sum of 1/n where n equals each requested denomination (e.g., five-dollar bill, ten-dollar bill) that is available for withdrawal at a transaction device 107, such that the maximum score is 1 and the minimum score is 0. Then processing device 103 may add each constraint's score together to determine a total score for each transaction device 107. In some embodiments, a higher score for a transaction device 107 may be associated with better satisfying the constraints of the request. Processing device 103 may store the total score in a data structure.

In some embodiments, each constraint may be weighted differently such that satisfying one constraint may be more important or valued more greatly than satisfying another. For example, processing device 103 may weigh the denomination constraint to be more important than the distance constraint by multiplying the denomination constraint by a predetermined importance factor (e.g., 1.1, 1.5, or any other number). The importance factor may be indicated by the user and sent, via mobile device 101, to processing device 103 as a constraint of the request. For example, the user may indicate on mobile device 101 that satisfying the denomination constraint is more important that satisfying the distance constraint. Mobile device 101 may send the indication to processing device 103 as a predetermined factor to be used during the score calculation. In other embodiments, each constraint is weighted equally.

In some embodiments, processing device 103 may be configured to create the ordered list by applying a series of at least one filter and/or weighting system to a database that comprises transaction devices. Processing device 103 may apply a first filter based on location. For example, processing device 103 may determine the nearest proximity transaction devices based on the user location and create a sorted list comprising nearest transaction devices to the user location to farthest transaction devices to the user location. Processing device 103 may also apply a weight to each element in the sorted list. For example, processing device 103 may weight each element in the sorted list such that to most highly ranked transaction devices connected to an interbank network associated with the user's bank, more highly ranked transaction devices connected to an interbank network associated with the partner banks of the user's bank, and least highly ranked transaction devices connected to any other interbank network. Processing device 103 may then apply a second filter to identify non-operational transaction devices. Processing device 103 may also apply a weight to the identified non-operational transaction devices such that they rank last in the sorted list. For example, processing device 103 may weight non-operational transaction devices last in the sorted list behind all other operational transaction devices. Processing device 103 may further apply a filter to determine which transaction devices have the requested denominations available for withdrawal. Processing device 103 may also apply a weight to each transaction device with the requested denominations available for withdrawal to rank them more highly. For example, processing device 103 may weigh transaction devices with the requested denominations available for withdrawal such that they rank more highly. Processing device 103 may store the created ordered list in a data structure.

Processing device 103 may then create a list of elements. Each element of the list may comprise a unique alphanumeric identification associated with each transaction device 107, an indication associated with each transaction device 107, and the calculated score associated with each transaction device 107. The indication associated with the transaction device 107 may include one of the group consisting of: requested denomination available with the Transaction device, requested denomination is not available with the Transaction device but cash withdrawals possible with other denominations, or Transaction device out of cash or out of service momentarily. Processing device 103 may determine the indication based on the queried data for each transaction device 107. For example, if a transaction device 107 satisfies the amount constraint (e.g., amount constraint equals 1) and partially satisfy the denomination constraint (e.g., denomination constraint between 0 and 1), then processing device 103 may assign the requested denomination is not available with the Transaction device but cash withdrawals possible with other denominations indication to the element of the list associated with that transaction device 107.

In some embodiments, processing device 103 may order the list such that the first elements of the list satisfy the at least one constraint better than the last elements of the list. Processing device 103 may be configured to send a number of elements of the list (e.g., 5, 10, or any other number less than or equal to the number of elements in the list) to mobile device 101. In some embodiments, the number of elements may be predetermined. In other embodiments, the number of elements may be determined by the user as a constraint of the request.

In some embodiments, each element may further comprise a distance. The distance may refer to the geographical distance between the user location and the Transaction device location. Processing device 103 may be configured to calculate the distance based on the user device location and the Transaction device location. For example, processing device may use the GPS coordinates, or longitude and latitude coordinates, of each location as inputs into a mathematical formula, such as the Haversine formula, to determine the distance. Further, processing device 103 may be configured to interface with a location API (e.g., Google Maps API) and may command the location API to calculate the distance between the user device location and the transaction device location and determine a travel route between the two locations. In other embodiments, processing device 103 may communicate the location data to machine learning system 111 and command machine learning system 111 to determine the distance.

In some embodiments, processing device 103 may send the ordered or ranked list to mobile device 101, as depicted in FIG. 2E. The user may select a transaction device 107 from the list displayed on mobile device 101 to continue with their transaction.

In step 309, processing device 103 may receive a selection made by a user on mobile device 101 indicating a transaction device 107 that the user wishes to perform the transaction. For example, a user may wish to perform the transaction with the third element on the list as displayed on mobile device 101 and their selection of the third element on the list may be communicated from mobile device 101 to processing device 103.

In step 311, processing device 103 may send instructions to interbank network 105 to reserve currency at the selected transaction device 107. Instructions may involve commanding interbank network 105 to modify the data stored in transaction device 107 so that the data associated with the number of each available denomination of currency is decreased by the number of each denomination of currency in the request. In doing so, the selected transaction device 107 may not be available to dispense the exact number of each denomination as indicated by the user in the request to any other individual that is not the user. Even though the physical denominations of currency may exist within the selected transaction device 107, because the data values associated with the number of available denominations of currency have been modified, transaction device 107 may not display the requested denominations as available to any individual other than the user.

In some embodiments, instructions may further involve processing device 103 commanding interbank network 105 to create and store in a memory location at least one new data value in the selected transaction device 107. The at least one new data value associated with the decreased amount, identifying information associated with the user (e.g., the user's account number or the like), and a time. In some embodiments, the new data value may configure the transaction device 107 that the breakdown of the total amount of currency in the request may only be withdrawn by the user.

In some embodiments, the time may refer to the duration of time after which the at least one new data value is added back to the selected transaction device 107 such that the requested denomination breakdown of currency may be recognized as available. Further, after the time elapses, the new data value is deleted from memory. By deleting the at least one new data value from memory, transaction device 107 is no longer in a state of reserving the amount of currency for the user. Further, the total amount of currency available for transactions in transaction device 107 is updated to include the currency associated with the at least one new data value. In this way, transaction device 107 is in a state that accurately reflects the available denominations of currency for transactions and improves future user interactions or transactions.

In some embodiments, reserving currency at the selected transaction device 107 may involve modifying the data in the selected transaction device 107. For example, processing device 103 may send instructions to processing device 103, interbank network 105, or any other device connected to the selected transaction device 107 to modify data associated with the number of each denomination of currency available for withdrawal at the selected transaction device 107 such that the requested denomination breakdown of currency may only be dispensed to the user for a predefined amount of time. The predefined amount of time may be set by an operator and/or owner of transaction device 107, interbank network 105, processing device 103, or bank 109. In some embodiments, processing device 103, interbank network 105, and/or machine learning system 111 may implement a set of business rules to implement the aforementioned reservation of currency function that blocks or limits the ability of transaction device 107 to dispense currency to any user.

For example, if the request includes a withdrawal of $50 broken down into 3 ten-dollar bills and 1 twenty-dollar bill, processing device 103 may instruct interbank network 105 to subtract 3 from the data associated with the number of available ten-dollar bills and 1 from the data associated with the number of available twenty-dollar bills from selected transaction device 107. Processing device 103 may also instruct interbank network 105 to create at least one new data value to be stored in transaction device 107 that informs transaction device 107 that there are 3 ten-dollar bills and 1 twenty-dollar bill available for withdrawal only by the user for the next 45 minutes. After 45 minutes, the at least one new data value will be added back to the data associated with the number of available ten-dollar bills and twenty-dollar bills, and then the at least one new data value will be deleted from Transaction device's memory.

In some embodiments, after reserving the currency at the selected transaction device 107, processing device 103 may generate a QR code, such as QR code 229 as depicted in FIG. 2F, to be sent to mobile device 101. The QR code may involve data associated with the currency reserved at transaction device 107 and identifying user information. In some embodiments, the data in the QR code may be encrypted using an encryption algorithm such as Advanced Encryption Standard (AES) or Rivest-Shamir-Adleman (RSA), or the like.

FIG. 4 is an example touchless Transaction device 400, consistent with disclosed embodiments. Transaction device 400 may be understood to be similar to transaction device 107 except for as disclosed below.

In some embodiments, such as the exemplary illustration depicted in FIG. 4, Transaction device 400 may involve a camera module 401, a touchless card reader 403, and a cash drawer 405. Transaction device 400 may further involve at least one processor. The at least one processor may include a data transfer module and an image processing unit. In some embodiments, Transaction device 400 may not involve a screen, visual display, or any other visual means of communication. In some embodiments, transaction device 400 may be configured to communicate with a user through non-visual means. For example, transaction device 400 may involve a speaker or the like to communicate with a user using auditory means. Transaction device 400, through the speaker, may communicate information regarding a transaction, such as the status of the transaction, through verbal communication, such as spoken language, or non-verbal communication, such as an error tone. Transaction device 400 may not involve any other input devices or means to select or initiate a transaction. In some embodiments, Transaction device 400 may be activated or operate without any direct user input. As used herein, direct user input refers to actions or interactions by a user that involve the user physically touching Transaction device 400.

In some embodiments, camera module 401 may be configured to capture images of QR codes or other symbols that may be used to communicate data. In some embodiments, camera module 401 may continuously or periodically monitor a predefined environment for a visual symbol, such as a QR code or other symbol, that may be used to communicate data to Transaction device 400. For example, camera module 401 may only monitor the predefined environment for QR codes during a set time (e.g., 9 AM-5 PM, 7 AM-7 PM, or any other time range). In some embodiments, the QR code may contain encrypted information comprising an amount of currency, a breakdown of the amount of currency by denomination, and user information associating the user with their bank and account. In some embodiments, transaction device 400 may be configured to only scan for the visual symbol when prompted by a user. Prompting may include a user triggering a motion sensor or proximity sensor with movement, such as by waving an arm or hand. Prompting may further include button actuation, such as a foot pedal that, when stepped on by a user, activates camera module 401. Prompting may further include a user triggering an audio sensor or sound sensor, such as by speaking or clapping.

In some embodiments, camera module 401 may be configured to monitor a predefined environment for images of QR codes or other symbols that may be used to communicate data. A predefined environment refers to the specific area or space that the camera module is configured to monitor. For example, camera module 401 may only monitor the environment directly in front of itself up to a set distance (e.g., 3 inches, 5 inches, 12 inches, or any other distance). The set distance may be predetermined based on the characteristics of camera module 401, such as resolution, sensor size, lens quality, aperture size, and the like. In some embodiments, camera module 401 may be fixed and only monitor a set area directly in front of transaction device 400. In other embodiments, camera module 401 may be operatively connected to an actuator, such as a motor, so that it may monitor a range of predetermined environments. For example, a user may prompt a sensor, such as a motion sensor with movement, to trigger the actuator to move or rotate camera module 401 to monitor a different predetermined environment. In some embodiments, camera module 401 may be the only device or component of transaction device 400 that may be configured to receive an input from a user. For example, transaction device 400 may involve no component or device, such as a keypad, touch display, or the like, configured to receive an input from a user other than camera module 401.

In some embodiments, camera module 401 may be operatively connected to an image processing unit. The image processing unit may be configured to at least partially decrypt and/or decode the information stored in the QR code detected and captured by camera module 401. In some embodiments, the image processing unit may be configured to partially decrypt the information stored in the QR code. Partially decrypt may refer to decrypting only part of the total amount of encrypted information. The image processing unit may only decrypt the information to determine with which bank and/or interbank network the information in the QR code is associated. For example, the image processing unit may be configured to identify which region of the QR code has encrypted information associated with which bank or interbank network to forward the transaction request. Further, the information stored in the QR code may be encrypted using more than one layer of encryption. For example, the information associated with which bank and/or interbank network to forward the transaction request may be encrypted on a first layer and more sensitive information (e.g., transaction request, account number) may be encrypted on a second layer. The image processing unit may be configured to decrypt only the first layer, and the bank and/or interbank network may be configured to decrypt the second layer. The image processing unit may be operatively connected to a data transfer module. The data transfer module may be configured to transmit the at least partially encrypted information to an interbank network. The data transfer module may be further configured to receive a command from the interbank network from a bank authorizing the transaction.

In some embodiments, the data transfer module may be configured to erase the information stored in the QR code. Transaction device 400 may not store the information from the QR code for security and data protection of users. For example, if transaction device 400 is stolen or hacked, users' account information is not comprised.

Touchless card reader 403 may be configured to read information from a card without requiring physical contact or tactile input. Touchless card reader 403 may utilize radio-frequency identification (RFID) or NFC technology to receive data from a card. The data from the card may involve an account associated with a user.

Cash Drawer 405 may be understood to be similar to cash drawer 107D, as described and exemplified elsewhere herein. Cash Drawer 405 may be a compartment or opening that exposes dispensed cash to a user for retrieval during cash withdrawal transactions. Cash Drawer 405 may involve at least one cash cassette, a cash dispensing mechanism, and sensors. A cash cassette refers to a secure and removable container that holds a specific denomination of currency (e.g., five-dollar bills, ten-dollar bills, and the like). A cash dispensing mechanism, also known as a currency dispensing mechanism, refers to a system of belts, rollers, sensors, and a control system that retrieves and dispenses cash to Cash Drawer 405 from the at least one cash cassette. The sensors may include cash dispensing sensors that verify the presence and movement of cash as the cash is dispensed to a user and cash cassette sensors that monitor the quantity of each denomination of currency or banknotes in each of the at least one cash cassette.

FIG. 5 is an example process for performing a transaction at Transaction device 400, consistent with disclosed embodiments. In some embodiments, transaction device 400 may perform each step of the transaction without direct user input, such as tactile input.

In step 501, Transaction device 400 detects and scans a QR code. For example, a user may hold a mobile device displaying a QR code up to camera module 401 of Transaction device 400.

In step 503, Transaction device 400 determines if the scanned QR code is valid or acceptable. For example, if the scanned QR code does not contain any information regarding a transaction at Transaction device 400, Transaction device 400 may determine the scanned QR code invalid and move to step 505B.

In step 505B, Transaction device 400 has determined the scanned QR code is invalid and ends the transaction. For example, if the scanned QR code is determined invalid, Transaction device 400 may return to step 501 and wait for another QR code to be scanned. In other embodiments, Transaction device 400 may inform the user that the scanned QR code is invalid. Transaction device 400 may communicate this information to the user using a visual display such as a screen, an audio speaker, or the like.

In step 505A, Transaction device 400 has determined the scanned QR code is valid and initiates the transaction as detailed in the information in the scanned QR code. In other embodiments, Transaction device 400 may inform the user that the scanned QR code is valid. Transaction device 400 may communicate this information to the user using a visual display such as a screen, an audio speaker, or the like.

In step 507, Transaction device 400 communicates the information from the scanned QR code to interbank network 105 to be verified by bank 109. Further, if the information is verified and the transaction is completed, the transaction information may be communicated to bank 109 via interbank network 105 so the user's account may be updated accordingly.

In step 509, Transaction device 400 dispenses cash equal to the requested amount as detailed in the information from the scanned QR code. For example, Transaction device 400 may activate internal mechanisms, such as the cash dispensing mechanism, to dispense cash to a user through cash drawer 405. Transaction device 400 may update data values associated with an amount of each denomination of currency available after dispensing the cash to the user. For example, transaction device 400 may subtract, from the data values associated with the amount of each denomination of currency available for transactions, the number of each denomination of currency dispensed to the user as part of the transaction.

Additional Aspects of the Present Disclosure May be Further Described Via the Following Clauses:

1. A system for currency amount determination, comprising:
   at least one processor; and
   at least one non-transitory computer-readable medium containing instructions that, when executed by the at least one processor, cause the at least one processor to perform operations comprising:
      receiving, from a user device, a request comprising at least one constraint for a transaction;
      communicating the request to at least one interbank network;
      determining at least one automated teller machine (ATM) that satisfies the at least one constraint of the request;
      providing, to the user device, the at least one ATM that satisfies the at least one constraint of the request;
      receiving, from the user device, a selection from a list of the at least one ATM that satisfies the at least one constraint of the request; and
      communicating, with the at least one interbank network, the selection from the list of at least one result to initialize the transaction.
2. The system of clause 1, wherein the at least one constraint of the request comprises at least one of:
   a bank, the bank associated with a user;
   a location, the location associated with the user;
   a total amount of currency; or
   a breakdown of the total amount of currency by denomination.
3. The system of clause 1, wherein communicating with the at least one interbank network comprises:
   commanding the at least one interbank network to query associated ATMs for data;
   receiving the data; and
   storing the data in a data structure.
4. The system of clause 1, wherein communicating with the at least one interbank network further comprises:
   redirecting the request to at least one interbank network associated with the bank;
   commanding the at least one interbank network associated with the bank to query associated ATMs for data;
   receiving the data; and
   storing the data in a data structure.
5. The system of clause 4, wherein determining the at least one ATM that satisfies the request comprises:
   calculating a score for each ATM based on the data stored in the data structure, the score calculated based how closely the ATM matches the at least one constraint of the request;
   ranking the ATMs by the score; and
   creating the list, each element of the list comprising:
      a unique alphanumeric identification associated with each ATM; and
      an indication associated with the ATM.
6. The system of clause 5, wherein the indication is selected from the group consisting of:
   requested denomination available with the ATM;
   requested denomination is not available with the ATM but cash withdrawals possible with other denominations; and
   ATM out of cash or out of service momentarily.

7. The system of clause 1, wherein initializing the transaction comprises:
instructing the at least one interbank network to modify data stored in the selected ATM by subtracting from the selection's data value of available currency the breakdown of the total amount of currency; and
instructing the at least one interbank network to create and store in a memory location a new data value in the selection, the new data value comprising identifying information associated with the user and the breakdown of the total amount of currency.
8. The system of clause 7, wherein the new data value configures the ATM that the breakdown of the total amount of currency may only be withdrawn by the user.
9. The system of clause 7, wherein the new data value further comprises a time, the time after which the new data value is added back to the selection's data value of available currency and deleted from the memory location.
10. The system of clause 5, wherein communicating with the at least one interbank network further comprises configuring a machine learning model to identify the interbank network associated with the bank.
11. A method for currency amount determination, comprising:
receiving, from a user device, a request comprising at least one constraint for a transaction;
communicating the request to at least one interbank network;
determining at least one automated teller machine (ATM) that satisfies the at least one constraint of the request;
providing, to the user device, the at least one ATM that satisfies the at least one constraint of the request;
receiving, from the user device, a selection from a list of the at least one ATM that satisfies the at least one constraint of the request; and
communicating, with the at least one interbank network, the selection from the list of at least one result to initialize the transaction.
12. The method of clause 11, wherein the at least one constraint of the request comprises at least one of:
a bank, the bank associated with a user;
a location, the location associated with the user;
a total amount of currency; or
a breakdown of the total amount of currency by denomination.
13. The method of clause 11, wherein communicating with the at least one interbank network comprises:
commanding the at least one interbank network to query associated ATMs for data;
receiving the data; and
storing the data in a data structure.
14. The method of clause 11, wherein communicating with the at least one interbank network further comprises:
redirecting the request to at least one interbank network associated with the bank;
commanding the at least one interbank network associated with the bank to query associated ATMs for data;
receiving the data; and
storing the data in a data structure.
15. The method of clause 14, wherein determining the at least one ATM that satisfies the request comprises:
calculating a score for each ATM based on the data stored in the data structure, the score calculated based how closely the ATM matches the at least one constraint of the request;
ranking the ATMs by the score; and
creating the list, each element of the list comprising:
a unique alphanumeric identification associated with each ATM; and
an indication associated with the ATM.
16. The method of clause 15, wherein the indication is selected from the group consisting of:
requested denomination available with the ATM;
requested denomination is not available with the ATM but cash withdrawals possible with other denominations; and
ATM out of cash or out of service momentarily.
17. The method of clause 11, wherein initializing the transaction comprises:
instructing the at least one interbank network to modify data stored in the selected ATM by subtracting from the selection's data value of available currency the breakdown of the total amount of currency; and
instructing the at least one interbank network to create and store in a memory location a new data value in the selection, the new data value comprising identifying information associated with the user and the breakdown of the total amount of currency.
18. The method of clause 17, wherein the new data value configures the ATM that the breakdown of the total amount of currency may only be withdrawn by the user.
19. The method of clause 17, wherein the new data value further comprises a time, the time after which the new data value is added back to the selection's data value of available currency and deleted from the memory location.
20. The method of clause 14, wherein communicating with the at least one interbank network further comprises configuring a machine learning model to identify the interbank network associated with the bank.
21. A system for facilitating automated teller machine (ATM) services for a user using machine learning, comprising:
at least one processor; and
at least one non-transitory computer-readable medium containing instructions that, when executed by the at least one processor, cause the at least one processor to perform operations comprising:
receiving, from at least one user device, a request comprising at least one constraint for a desired transaction, the at least one constraint comprising language;
analyzing, via a language model, the language in the at least one constraint of the request;
based on the analysis, determining at least one ATM that satisfies the at least one constraint of the request;
providing, to the user device, the at least one ATM that satisfies the at least one constraint of the request a list of at least one result;
receiving, from the user device, a selection from a list of the at least one ATM that satisfies the at least one constraint of the request; and
communicating, with at least one interbank network, the selection from the list.

22. The system of clause 21, wherein the at least one constraint of the request comprises at least one of:
a bank, the bank associated with a user;
a location;
a total amount of currency; or
a breakdown of the total amount of currency by denomination.
23. The system of clause 22, wherein the location is determined by at least one of:
a postal code; or
location data associated with the user device's location.
24. The system of clause 21, wherein analyzing the language comprises:
sending, to at least one machine-learning model, the language contained in the request; and
receiving, from the at least one machine-learning model, an assessment of the language.
25. The system of clause 21, wherein the language in the at least one constraint of the request comprises free form text.
26. The system of clause 21, wherein the language in the at least one constraint of the request comprises spoken language.
27. The system of clause 21, wherein the language model is trained to perform operations comprising:
determining, using a classification engine stored in one or more memories of one or more computing devices, with which interbank network the request is associated; and
providing, to the user, a response specific to the interbank network associated with the request, the response comprising financial services options.
28. The system of clause 27, wherein the language model training comprises providing, to a classification engine stored in one or more memories of one or more computing devices, a training dataset, the training dataset tailored to a particular domain or application to optimize the language model.
29. The system of clause 27, wherein the financial services options comprise at least one of:
withdraw funds from an account;
PIN services;
block/hotlist card;
re-issue card;
deposit funds into the account;
bill payment; or
transfer funds between accounts.
30. The system of clause 21, wherein determining the at least one ATM that satisfies at least one constraint of the request comprises:
commanding the at least one interbank network associated with the request to query associated ATMs for data;
receiving the data;
storing the data in a data structure;
calculating a score for each ATM based on the data stored in the data structure, the score calculated based how closely the ATM matches the at least one constraint of the request;
ranking the ATMs by the score; and
creating the list, each element of the list comprising:
a unique alphanumeric identification associated with each ATM; and
an indication associated with the ATM.
31. A method for facilitating automated teller machine (ATM) services for a user using machine learning, comprising:
receiving, from at least one user device, a request comprising at least one constraint for a transaction, the at least one constraint comprising language;
analyzing, via a language model, the language in the at least one constraint of the request;
based on the analysis, determining at least one ATM that satisfies the at least one constraint of the request;
providing, to the user device, the at least one ATM that satisfies the at least one constraint of the request a list of at least one result;
receiving, from the user device, a selection from a list of the at least one ATM that satisfies the at least one constraint of the request; and
communicating, with at least one interbank network, the selection from the list.
32. The method of clause 31, wherein the at least one constraint of the request comprises at least one of:
a bank, the bank associated with a user;
a location;
a total amount of currency; or
a breakdown of the total amount of currency by denomination.
33. The method of clause 32, wherein the location is determined by at least one of:
a postal code; or
location data associated with the user device's location.
34. The method of clause 31, wherein analyzing the language comprises:
sending, to at least one machine-learning model, the language contained in the request; and
receiving, from the at least one machine-learning model, an assessment of the language.
35. The method of clause 31, wherein the language in the at least one constraint of the request comprises free form text.
36. The method of clause 31, wherein the language in the at least one constraint of the request comprises spoken language.
37. The method of clause 31, wherein the language model is trained to perform operations comprising:
determining, using a classification engine stored in one or more memories of one or more computing devices, with which interbank network the request is associated; and
providing, to the user, a response specific to the interbank network associated with the request, the response comprising financial services options.
38. The method of clause 37, wherein the language model training comprises providing, to a classification engine stored in one or more memories of one or more computing devices, a training dataset, the training dataset tailored to a particular domain or application to optimize the language model.
39. The method of clause 37, wherein the financial services options comprise at least one of:
withdrawal of cash from an account;
PIN services;
block/hotlist card;
re-issue card;
deposit funds into the account;
bill payment; or
transfers between accounts.
40. The method of clause 31, wherein determining the at least one ATM that satisfies at least one constraint of the request comprises:

commanding the at least one interbank network associated with the request to query associated ATMs for data;

receiving the data;

storing the data in a data structure;

calculating a score for each ATM based on the data stored in the data structure, the score calculated based how closely the ATM matches the at least one constraint of the request;

ranking the ATMs by the score; and creating the list, each element of the list comprising:

a unique alphanumeric identification associated with each ATM; and an indication associated with the ATM.

41. A touchless ATM, comprising:

a currency dispensing mechanism configured to provide currency in multiple denominations;

a camera module for capturing images of a code, the camera module configured to operate without user input;

at least one processor; and at least one non-transitory computer-readable medium containing instructions that, when executed by the at least one processor, cause the system to perform operations comprising:

detecting, using the camera module, a QR code;

based on detecting the QR code, initiating a data transfer module operatively connected to an image processing unit, the data transfer module configured to transfer and erase information associated with the QR code;

sending the information to an interbank network;

receiving a command from the interbank network to authorize a transaction; and activating the currency dispensing mechanism without direct user input.

42. The touchless ATM of clause 41, wherein the touchless ATM communicates with a user via non-visual means.

43. The touchless ATM of clause 41, wherein the camera module is the only device configured to receive input from a user.

44. The touchless ATM of clause 41, wherein at least one processor is further configured to receive the QR code from a user device.

45. The touchless ATM of clause 41, wherein the QR code contains encrypted information comprising:

an amount of currency;

a breakdown of an amount of currency by denomination; and user information, the user information comprising a user and a bank associated with the user.

46. The touchless ATM of clause 41, wherein the camera module is configured to capture images of QR codes.

47. The touchless ATM of clause 41, wherein the camera module is configured to continuously or periodically monitor for QR codes.

48. The touchless ATM of clause 41, wherein the data transfer module is further configured to perform operations comprising:

identifying with which interbank network the information is associated; and sending the information to the associated interbank network.

49. The touchless ATM of clause 41, wherein the processor is further configured to activate the currency dispensing mechanism without receiving tactile input.

50. The touchless ATM of clause 45, wherein activating the currency dispensing mechanism comprises:

dispensing currency equal to the amount of currency; and updating a data value associated with an amount of currency available.

51. A method for using a touchless ATM comprising:

detecting, using a camera module, a QR code;

based on detecting the QR code, initiating a data transfer module operatively connected to an image processing unit, the data transfer module configured to transfer and erase information associated with the QR code;

sending the information to an interbank network;

receiving a command from the interbank network to authorize a transaction; and activating the currency dispensing mechanism without direct user input via an input device associated with the ATM.

52. The method of clause 51, wherein the touchless ATM communicates with a user via non-visual means.

53. The method of clause 51, further comprising receiving input only from the camera module.

54. The method of clause 51, wherein the QR code is displayed for detection via a user device.

55. The method of clause 51, wherein the QR code contains encrypted information comprising:

an amount of currency;

a breakdown of an amount of currency by denomination; and user information, the user information comprising a user and a bank associated with the user.

56. The method of clause 51, wherein the camera module is configured to capture images of QR codes.

57. The method of clause 51, wherein the camera module is configured to continuously or periodically monitor for QR codes.

58. The method of clause 51, wherein the data transfer module is further configured to perform operations comprising:

identifying with which interbank network the information is associated; and sending the information to the associated interbank network.

59. The method of clause 51, wherein activating the currency dispensing mechanism without direct user input comprises the user not directly and physically touching the ATM.

60. The method of clause 55, wherein activating the currency dispensing mechanism comprises:

dispensing currency equal to the amount of currency; and updating a data value associated with an amount of currency available.

Certain features which, for clarity, are described in this specification in the context of separate embodiments may also be provided in combination in a single embodiment. Conversely, various features which, for brevity, are described in the context of a single embodiment may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

The term "processor," as used herein, refers to one or more processors. The disclosed systems may be implemented in part or in full on various computers, electronic devices, computer-readable media (such as CDs, DVDs, flash drives, hard drives, or other storage), or other electronic devices or storage devices. The methods and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for currency amount determination, comprising:
- at least one processor; and
- at least one non-transitory computer-readable medium containing instructions that, when executed by the at least one processor, cause the at least one processor to perform operations comprising:
  - receiving, from a user device, a request comprising at least one constraint for a transaction, wherein the at least one constraint includes a breakdown of currency by denomination;
  - communicating the request to at least one interbank network;
  - determining at least one automated teller machine (ATM) that satisfies the at least one constraint of the request;
  - providing, to the user device, the at least one ATM that satisfies the at least one constraint of the request;
  - receiving, from the user device, a selection from a list of the at least one ATM that satisfies the at least one constraint of the request; and
  - communicating, with the at least one interbank network, the selection from the list of at least one result, wherein communicating the selection includes initiating the transaction, wherein initiating the transaction comprises causing the at least one interbank network to modify data stored in the selected ATM by:
    - decreasing a number of each available denomination of currency by a number of each denomination of currency in the request; and
    - creating at least one data value associated with the number of each denomination of currency in the request and a time,
    - wherein, after the time elapses, the selected ATM deletes the at least one data value and increases the number of each available denomination of currency by the number of each denomination of currency in the request.

2. The system of claim 1, wherein the at least one constraint of the request further comprises at least one of:
- a bank, the bank associated with a user;
- a location, the location associated with the user; or
- a total amount of currency.

3. The system of claim 1, wherein communicating with the at least one interbank network comprises:
- commanding the at least one interbank network to query associated ATMs for data;
- receiving the data; and
- storing the data in a data structure.

4. The system of claim 1, wherein communicating with the at least one interbank network further comprises:
- redirecting the request to at least one interbank network associated with a bank associated with a user;
- commanding the at least one interbank network associated with the bank to query associated ATMs for data;
- receiving the data; and
- storing the data in a data structure.

5. The system of claim 4, wherein determining the at least one ATM that satisfies the request comprises:
- calculating a score for each ATM of the at least one ATM based on the data stored in the data structure, the score calculated based how closely the ATM matches the at least one constraint of the request;
- ranking the ATMs each ATM of the at least one ATM by the score; and
- creating the list, each element of the list comprising:
  - a unique alphanumeric identification associated with an ATM; and
  - an indication associated with the ATM.

6. The system of claim 5, wherein the indication is selected from the group consisting of:
- requested denomination available with the ATM;
- requested denomination is not available with the ATM but cash withdrawals possible with other denominations; and
- ATM out of cash or out of service momentarily.

7. The system of claim 1, wherein initiating the transaction further comprises:

instructing the at least one interbank network to create and store in a memory location a new data value in the selection, the new the at least one data value comprising is further associated with identifying information associated with a user and the breakdown of currency by denomination.

8. The system of claim 7, wherein the at least one data value configures the selected ATM that the breakdown of currency by denomination may only be withdrawn by the user.

9. The system of claim 5, wherein communicating with the at least one interbank network further comprises configuring a machine learning model to identify the interbank network associated with a bank associated with a user.

10. A method for currency amount determination, comprising:

receiving, from a user device, a request comprising at least one constraint for a transaction, wherein the at least one constraint includes a breakdown of currency by denomination;

communicating the request to at least one interbank network;

determining at least one automated teller machine (ATM) that satisfies the at least one constraint of the request;

providing, to the user device, the at least one ATM that satisfies the at least one constraint of the request;

receiving, from the user device, a selection from a list of the at least one ATM that satisfies the at least one constraint of the request; and communicating, with the at least one interbank network, the selection from the list of at least one result, wherein communicating the selection includes initiating the transaction, wherein initiating the transaction comprises causing the at least one interbank network to modify data stored in the selected ATM by:

decreasing a number of each available denomination of currency by a number of each denomination of currency in the request; and creating at least one data value associated with the number of each denomination of currency in the request and a time, wherein, after the time elapses, the selected ATM deletes the at least one data value and increases the number of each available denomination of currency by the number of each denomination of currency in the request.

11. The method of claim 10, wherein the at least one constraint of the request further comprises at least one of:

a bank, the bank associated with a user;

a location, the location associated with the user; or a total amount of currency.

12. The method of claim 10, wherein communicating with the at least one interbank network comprises:

commanding the at least one interbank network to query associated ATMs for data;

receiving the data; and storing the data in a data structure.

13. The method of claim 10, wherein communicating with the at least one interbank network further comprises:

redirecting the request to at least one interbank network associated with a bank associated with a user;

commanding the at least one interbank network associated with the bank to query associated ATMs for data;

receiving the data; and storing the data in a data structure.

14. The method of claim 13, wherein determining the at least one ATM that satisfies the request comprises:

calculating a score for each ATM of the at least one ATM based on the data stored in the data structure, the score calculated based how closely the ATM matches the at least one constraint of the request;

ranking the ATMs each ATM of the at least one ATM by the score; and creating the list, each element of the list comprising:

a unique alphanumeric identification associated with an ATM; and an indication associated with the ATM.

15. The method of claim 14, wherein the indication is selected from the group consisting of:

requested denomination available with the ATM;

requested denomination is not available with the ATM but cash withdrawals possible with other denominations; and ATM out of cash or out of service momentarily.

16. The method of claim 10, wherein initiating the transaction further comprises:

instructing the at least one interbank network to create and store in a memory location a new data value in the selection, the new the at least one data value comprising is further associated with identifying information associated with a user and the breakdown of currency by denomination.

17. The method of claim 16, wherein the at least one data value configures the selected ATM that the breakdown of currency by denomination may only be withdrawn by the user.

18. The method of claim 13, wherein communicating with the at least one interbank network further comprises configuring a machine learning model to identify the interbank network associated with a bank associated with the user.

* * * * *